United States Patent
Yamakawa et al.

(10) Patent No.: US 10,099,132 B2
(45) Date of Patent: Oct. 16, 2018

(54) GAME IMAGE GENERATION DEVICE AND PROGRAM

(71) Applicant: SEGA SAMMY CREATION INC., Tokyo (JP)

(72) Inventors: Yoshihiro Yamakawa, Tokyo (JP); Akihiro Suzuki, Tokyo (JP); Kazuya Suzuki, Tokyo (JP); Kazutomo Sambongi, Tokyo (JP)

(73) Assignee: SEGA SAMMY CREATION INC., Tokyo (JP)

( * ) Notice: Subject to any disclaimer, the term of this patent is extended or adjusted under 35 U.S.C. 154(b) by 0 days.

(21) Appl. No.: 15/311,015

(22) PCT Filed: May 16, 2014

(86) PCT No.: PCT/JP2014/063128
§ 371 (c)(1),
(2) Date: Nov. 14, 2016

(87) PCT Pub. No.: WO2015/173967
PCT Pub. Date: Nov. 19, 2015

(65) Prior Publication Data
US 2017/0080343 A1    Mar. 23, 2017

(51) Int. Cl.
*A63F 9/24* (2006.01)
*A63F 13/00* (2014.01)
*G06F 17/00* (2006.01)
(Continued)

(52) U.S. Cl.
CPC .............. *A63F 13/52* (2014.09); *A63F 13/25* (2014.09); *A63F 13/57* (2014.09); *A63F 13/80* (2014.09); *G07F 17/32* (2013.01)

(58) Field of Classification Search
CPC .......... A63F 13/52; A63F 13/25; A63F 13/57; A63F 13/80; G07F 17/32
See application file for complete search history.

(56) References Cited

U.S. PATENT DOCUMENTS

| 5,111,409 | A | * | 5/1992 | Gasper | .................... | A63F 13/10 |
| | | | | | | 434/167 |
| 5,261,041 | A | * | 11/1993 | Susman | .................. | G06T 13/00 |
| | | | | | | 345/419 |

(Continued)

FOREIGN PATENT DOCUMENTS

| JP | 11-300034 A | 11/1999 |
| JP | 2000-149042 A | 5/2000 |

(Continued)

OTHER PUBLICATIONS

Office Action issued in related application JP 2016-519081, dated Sep. 6, 2018, with machine generated English language translation, 7 pages.

*Primary Examiner* — Kevin Y Kim
(74) *Attorney, Agent, or Firm* — Drinker Biddle & Reath LLP

(57) ABSTRACT

Moving image information is stored in a plurality of types in accordance with different actions of the subject, and a first moving image is switched to a second moving image by inserting an interpolation image that connects a frame image at the end of the first moving image to a frame image at the beginning of the second moving image. According to the present disclosure, a wide variety of actions performed by the subject can be expressed while using live-action moving images.

9 Claims, 17 Drawing Sheets

(51) Int. Cl.
 *G06F 19/00* (2018.01)
 *A63F 13/52* (2014.01)
 *A63F 13/80* (2014.01)
 *A63F 13/25* (2014.01)
 *G07F 17/32* (2006.01)
 *A63F 13/57* (2014.01)

(56) References Cited

U.S. PATENT DOCUMENTS

| | | | | |
|---|---|---|---|---|
| 5,680,531 | A | * | 10/1997 | Litwinowicz ........... G06T 13/80 345/473 |
| 6,607,443 | B1 | | 8/2003 | Miyamoto et al. |
| 8,154,606 | B2 | * | 4/2012 | Tokuyama .............. G07F 17/32 348/208.16 |
| 2003/0064801 | A1 | * | 4/2003 | Breckner ................ G07F 17/32 463/30 |
| 2005/0239525 | A1 | | 10/2005 | Sato |
| 2007/0126874 | A1 | | 6/2007 | Kake |
| 2009/0201297 | A1 | | 8/2009 | Johansson |
| 2013/0005456 | A1 | | 1/2013 | Okujo et al. |
| 2013/0176460 | A1 | | 7/2013 | Nakashima |

FOREIGN PATENT DOCUMENTS

| | | | |
|---|---|---|---|
| JP | 2001-148035 | A | 5/2001 |
| JP | 2001-160150 | A | 6/2001 |
| JP | 2005-312729 | A | 11/2005 |
| JP | 2006-197256 | A | 7/2006 |
| JP | 2007-151647 | A | 6/2007 |
| JP | 2009-122184 | A | 6/2009 |
| JP | 2010-103643 | A | 5/2010 |
| JP | 2011-515726 | A | 5/2011 |
| JP | 2013-013471 | A | 1/2013 |
| JP | 2013-165485 | A | 8/2013 |

* cited by examiner

FIG.10
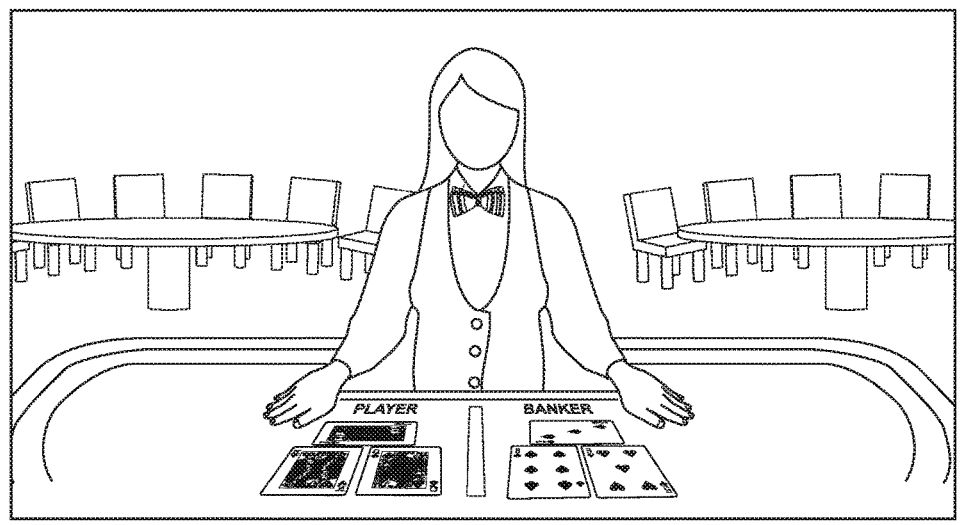
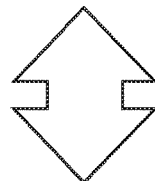
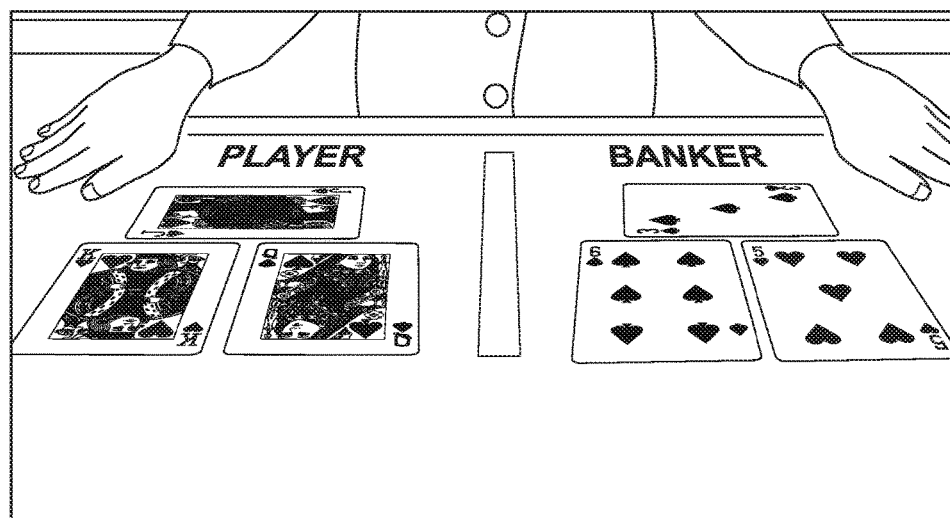

*FIG.11*
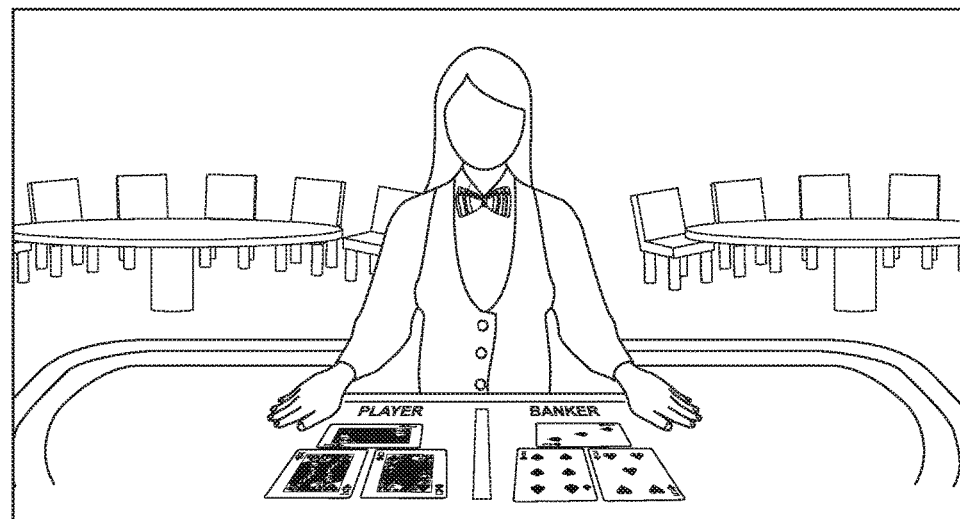
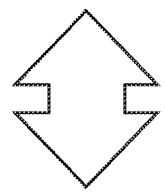
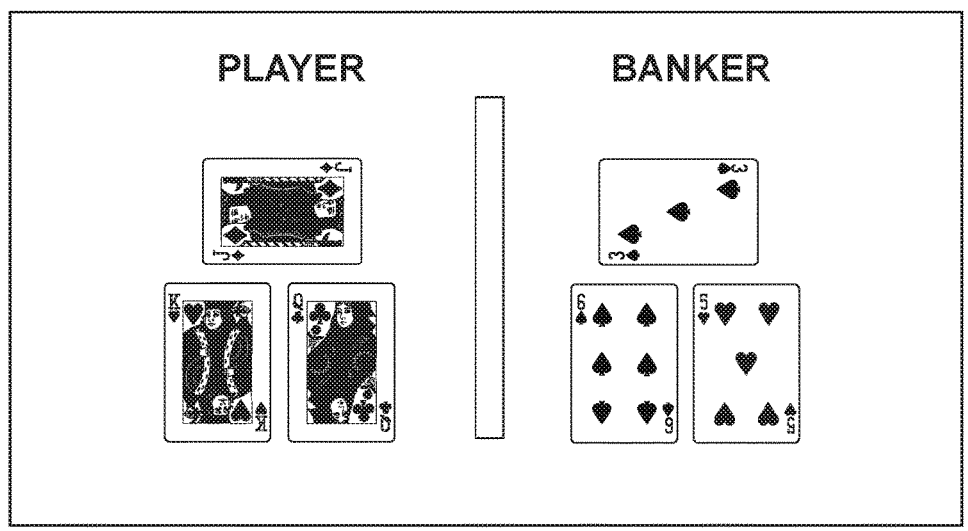

GAME IMAGE GENERATION DEVICE AND PROGRAM

CROSS-REFERENCE TO RELATED APPLICATIONS

This application is the U.S. national phase of the International Patent Application No. PCT/JP2014/063128 filed May 16, 2014, the entire content of which is incorporated herein by reference.

TECHNICAL FIELD

The present disclosure relates to a game image generation technique for generating an image of a card game or the like.

BACKGROUND

Game systems that allow a large number of people to play a card game with the help of a computer device are being developed. For example, Patent Publication JP-A-2013-13471 (Patent Document 1: FIG. 1 and so on) discloses a game system configured such that an image of a table game such as baccarat, which is played on a game table used by a dealer, is captured by a motion-picture camera and distributed to a plurality of participant terminals via a network, while game result information and dividend information are managed by a management server.

In the game system described in Patent Document 1, the card game itself is executed by an actual dealer, and therefore labor costs cannot be reduced. Hence, a configuration in which the role of the dealer who handles the cards is played by a computer device may be considered. When the role of the dealer is played by a computer device, an anthropomorphic character who acts as the dealer must be generated and displayed as an image in order to realize operations of the computer device. A method of generating and displaying a stereoscopic image representing a dealer or a method employing a live-action movie obtained by filming a person dressed up as a real-life dealer may be used as an image display method in this case.

In the former method, actions of the dealer can be modified freely in accordance with the progress of the game. However, a calculation load involved in generating the image is high, and since the dealer is a stereoscopic image created by a computer device, an artificial impression may be imparted, causing the players to lose interest. With the latter method, on the other hand, a live-action dealer is displayed, and therefore a favorable visual impression is imparted to the players. As a result, the players are more likely to take the game system seriously.

Patent Publication JP-A-2001-148035 (Patent Document 2: paragraph 0013), for example, discloses a conventional image processing device that can be used as an image processing technique for displaying live-action movie images together with stereoscopic images. In this image processing device, a calculation amount required during image processing for generating a stereoscopic image is reduced by implementing the image processing on a first display body constituted by a movie image and a second display body constituted by a stereoscopic image formed from polygon data after determining a degree of priority thereof by means of hidden surface elimination.

SUMMARY

However, with the technique described in Patent Document 2, the actions of the dealer are limited to the live-action movies filmed in advance, and therefore the actions of the dealer cannot be modified in accordance with the progress of the card game. Playing live-action movies showing the same recorded actions of the dealer over and over again becomes monotonous, and as a result, the players receive a strong impression that the movies has been generated mechanically by a computer, thereby eliminating the advantage of a live-action movie, i.e. that a real-life dealer is displayed. However, when live-action movies showing different actions of the dealer are filmed and prepared in a large number of patterns in advance, creation costs increase without limit and storage capacity is wasted, and this cannot therefore be considered a realistic solution.

Hence, an object of the present disclosure is to provide a game image generation technique with which a wide variety of actions performed by a subject can be expressed while using live-action moving images.

To solve the problems described above, a game image generation device according to the present disclosure is used to generate an image of a game, and comprises a moving image storage unit that stores moving image information used to generate a moving image of a subject, a moving image generation unit that generates the moving image by reading the moving image information, and a game control unit that controls progress of the game, wherein the moving image information is stored in a plurality of types in accordance with different actions of the subject, and the moving image generation unit switches from a first moving image to a second moving image by inserting an interpolation image that connects a frame image of a basic attitude at the end of the first moving image to a frame image of the basic attitude at the start of the second moving image.

Preferably, the moving image information is obtained by filming the subject from a predetermined filming viewpoint while the subject handles colored cards colored a specific color on a colored table colored the specific color using the specific color as a background, and then implementing chroma key processing to remove the specific color, and the game image generation device further comprises: an object arranging unit that arranges a table object, card objects, and a moving image plane on which the moving image is mapped on a world coordinate system; a viewpoint setting unit that sets a relative position of a viewpoint relative to the card objects on the world coordinate system so as to correspond to a relative position of the filming viewpoint relative to the colored cards during filming of the moving image; a mapping unit that maps textures onto the table object and the card objects and maps the moving image on the moving image plane; and a projection conversion unit that performs projection conversion using the viewpoint as a reference.

To solve the problems described above, a game image generation program according to the present disclosure is used to generate an image of a game on a computer, the game image generation program causing the computer to execute the steps of: storing a plurality of types of moving image information, the moving image information being used to generate a moving image of a subject, in accordance with different actions of the subject; and generating the moving image by reading the moving image information, while switching from a first moving image to a second moving image by inserting an interpolation image that connects a frame image at the end of the first moving image to a frame image at the beginning of the second moving image.

Preferably, the moving image information is obtained by filming the subject from a predetermined filming viewpoint while the subject handles colored cards colored a specific color on a colored table colored the specific color using the specific color as a background, and then implementing chroma key processing to remove the specific color, and the game image generation program further comprises the steps of: arranging a table object, card objects, and a moving image plane on which the moving image is mapped on a world coordinate system; setting a relative position of a viewpoint relative to the card objects on the world coordinate system so as to correspond to a relative position of the filming viewpoint relative to the colored cards during filming of the moving image; mapping textures onto the table object and the card objects and mapping the moving image on the moving image plane; and performing projection conversion using the viewpoint as a reference.

According to the present disclosure, the first moving image is switched to the second moving image by inserting the interpolation image that connects the frame image at the end of the first moving image to the frame image at the start of the second moving image, and therefore a plurality of moving images displaying different actions of the subject can be connected freely. As a result, images of natural actions that appear to depict a real-life person acting freely instead of repeating the same actions mechanically can be displayed even when live-action moving images are used.

BRIEF DESCRIPTION OF DRAWINGS

FIG. 10 is an example of an image display obtained as a result of the enlargement processing performed using stereoscopic images, according to this embodiment.

FIG. 11 is an example of an image display obtained as a result of enlargement processing performed using two-dimensional images, according to this embodiment.

DETAILED DESCRIPTION

Figure 1:
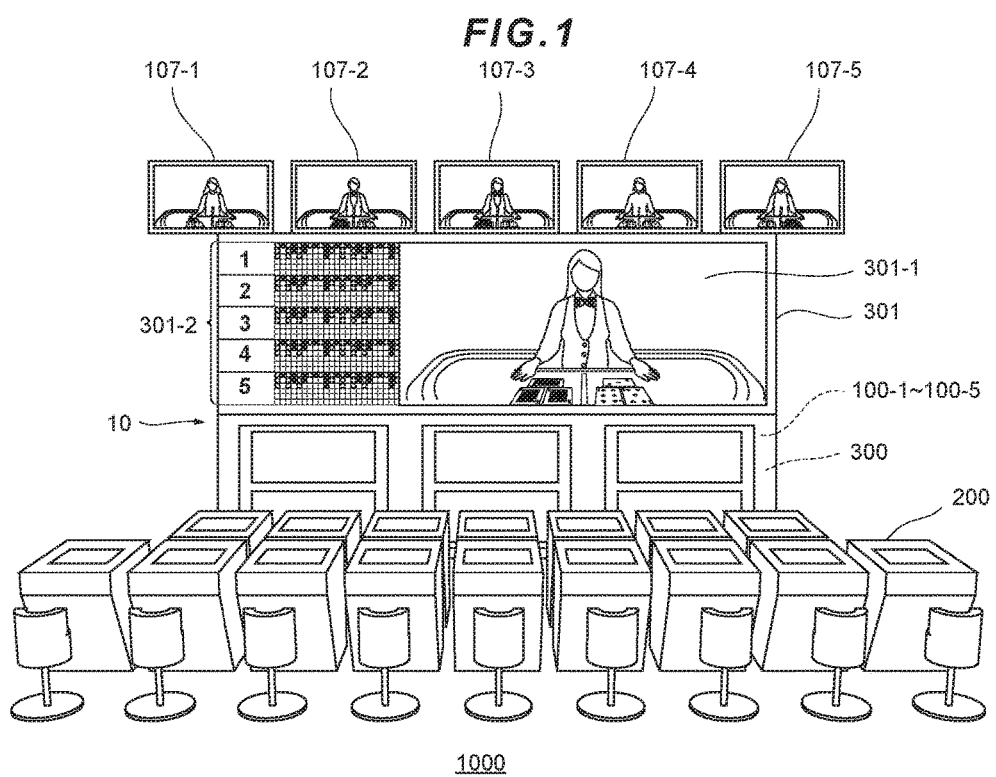
FIG. 1 is an external view showing a configuration of a card game system according to an embodiment.

An embodiment of the present disclosure will be described in detail below. Note that the embodiment described below is merely an example used to illustrate the present disclosure, and the present disclosure is not limited to this embodiment alone. Further, various amendments may be applied to the present disclosure within a scope that does not depart from the spirit thereof. Moreover, a person skilled in the art may employ embodiments in which the respective elements to be described below are replaced by equivalents, and these embodiments are also included in the scope of the present disclosure. Furthermore, it is assumed, unless indicated otherwise, that positional relationships expressed where necessary in terms of up, down, left, right, and so on are based on the depictions in the drawings. Moreover, various dimensional ratios shown in the drawings are not limited to the illustrated ratios.

Embodiment

In the following embodiment, a card game system configured to be capable of realizing a game of baccarat, which serves here as a representative card game, will be described as an example. More specifically, in this embodiment, a game image generation technique according to the present disclosure is applied to a dealer who oversees a game of baccarat. Note, however, that the type of card game is not limited to baccarat, and the present disclosure may be applied to various other card games. Moreover, the subject of the moving images obtained in the form of live-action movies is not limited to a dealer, and moving images obtained by filming a subject other than a dealer may be used instead.

0. Definitions

Terms used in this specification are defined as follows:

"User": a participant who predicts and bets on the outcome of a card game in a card game system. The user participates in the card game from a station.

"Baccarat": a traditional card game in which a user predicts and bets on the outcome of a card game played by a banker (a bookmaker) and a player (a customer). The user simply predicts the outcome of the game, and the game is popular in casinos all over the world due to the simplicity thereof and so on. A dealer deals two to three cards each to the banker and the player in accordance with certain rules, and the winner is the person whose cards have a total face value with an initial digit closest to "9".

"Bet": the bet represents the prediction of the user. More specifically, the user predicts that the banker will win (Banker), that the player will win (Player), or that the contest will end in a tie (Tie), and places a bet in accordance with the prediction of the outcome.

"Bet amount": this can be specified by each user as desired, and when the prediction of the user is correct, the user obtains a dividend corresponding to the bet amount.

"Betting area": a virtual area in which the user places betting chips. Betting areas are prepared in accordance with a prediction that the banker will win (Banker), a prediction that the player will win (Player), and a prediction that the contest will end in a tie (Tie).

"Table": a virtual table reproducing a card table used by a dealer in an actual casino to handle the cards. In this embodiment, five tables are prepared.

"Moving image": a series of frame images that are displayed consecutively at intervals of a predetermined synchronization period so that a subject appears to move. A format in which the moving image is compressed and encrypted using a known moving image standard such as MPEG (Moving Picture Experts Group) may be employed as a recording format of the moving image. In this specification, the term "moving image" refers to both the series of frame images, as well as data obtained by compressing and encrypting the series of frame images, and the moving image itself that is displayed when the data are reproduced. In the present disclosure, the moving image is obtained by filming and recording a subject using a video camera.

"Dealer": the dealer is the subject of the live-action moving image, i.e. a model of the moving image.

1. System Configuration

FIG. 1 is a schematic external view showing a configuration of the card game system according to this embodiment. As shown in FIG. 1, a card game system 1000 according to this embodiment is configured to include a main body 10 and a plurality of stations 200, a large main display 301 being disposed in the center of the main body 10.

Five sub displays 107-1 to 107-5 are disposed in an upper portion of the main body 10. Although not shown in the drawing, a main controller 300 and five sub controllers 100-1 to 100-5 are disposed in the interior of the main body 10. The main display 301 serves as display means for displaying images generated by the main controller 300, and is divided into a dealer display region 301-1 and an all table history display region 301-2. An image displayed in the dealer display region 301-1 is identical to an image displayed on one of the sub displays 107-1 to 107-5. In FIG. 1, the dealer display region 301-1 of the main display 301 displays an identical image to the image displayed on the sub display 107-3.

The plurality of stations 200 are terminal devices disposed on a front surface of the main body 10, at which users sit down in order to participate in the card game. A touch panel display is installed in each of the plurality of stations 200.

Figure 2:
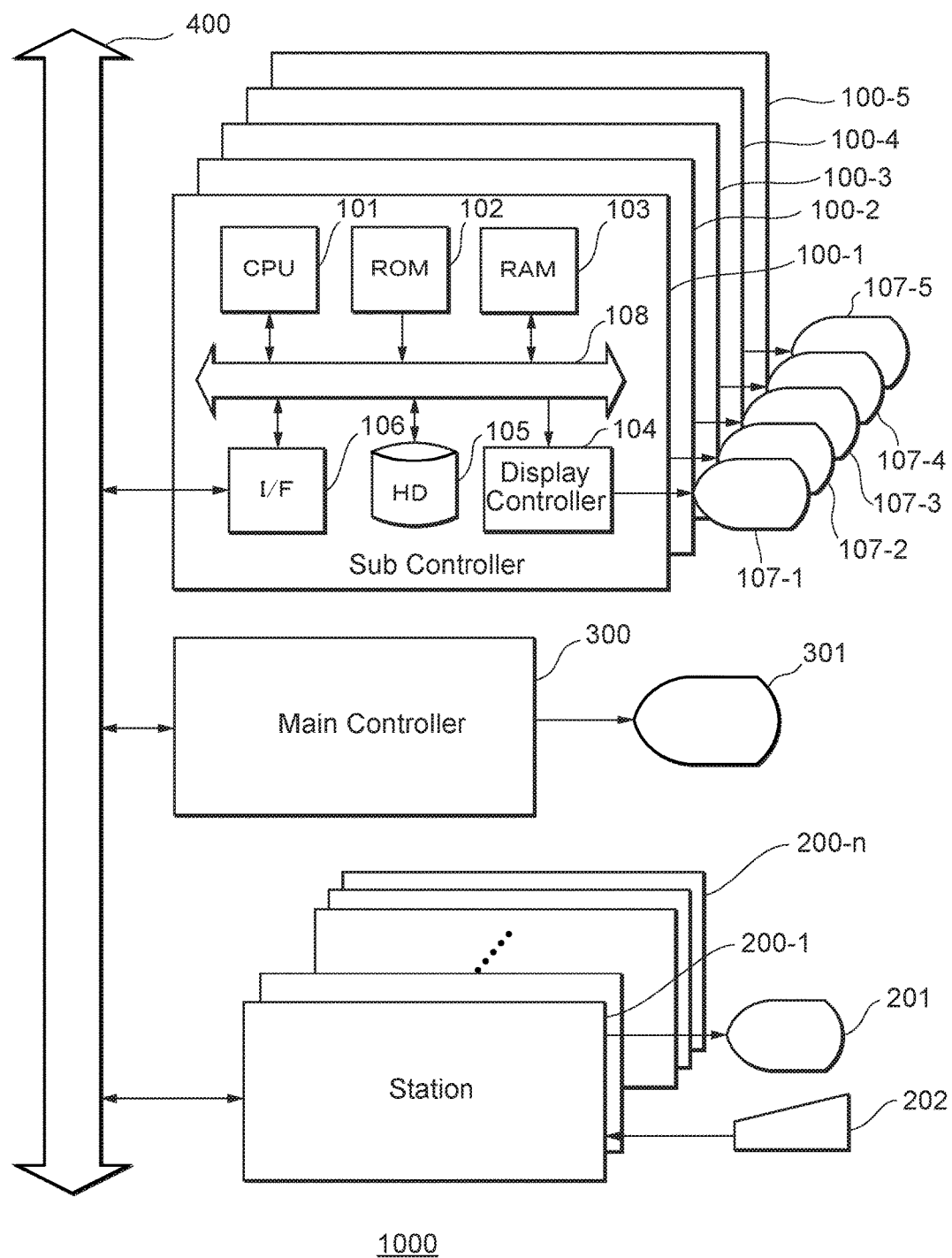
FIG. 2 is a system diagram showing the card game system according to this embodiment.

FIG. 2 is a system diagram showing the card game system according to this embodiment. As shown in FIG. 2, the card game system 1000 according to this embodiment is configured such that the plurality of sub controllers 100-1 to 100-5, the plurality of stations 200-$n$ (where n is a natural number no smaller than 2), and the main controller 300 are connected to each other via a network 400.

The sub controllers 100-1 to 100-5 are respectively constituted by computer devices and configured to be capable of executing a card game independently of each other. The term "the sub controllers 100" will be used hereafter to refer to the five sub controllers 100-1 to 100-5 in common. Each sub controller 100 comprises a game image generation device according to the present disclosure. More specifically, each sub controller 100 is configured to include a CPU (Central Processing Unit) 101, a ROM (Read Only Memory) 102, a RAM (Random Access Memory) 103, a display controller 104, a hard disk 105, and an interface device 106. The sub displays 107-1 to 107-5 (the term "the sub displays 107" will be used hereafter to refer to the five sub displays 107-1 to 107-5 in common) are connected respectively to the display controllers 104 of the sub controllers 100-1 to 100-5. An initial program loader for activating the system, and so on are stored in the ROM 102. The RAM 103 serves as memory means used by the CPU 101 as a temporary storage area. The display controller 104 comprises a frame memory, not shown in the drawing, and is capable of generating image data at intervals of a predetermined update timing in response to control executed by the CPU 101, storing the generated image data in the frame memory, and outputting the stored image data to the sub displays 107. Software programs comprising a game image generation program according to the present disclosure and moving image information are stored in the hard disk 105. The interface device 106 executes data transmission and reception between the main controller 300 and the stations 200-$n$ via the network 400.

In each sub controller 100, the CPU 101 executes the initial program loader stored in the ROM 102 so that the game image generation program according to the present disclosure, the moving image information, and a control software program are transferred appropriately from the hard disk 105 to the RAM 103 and executed, and as a result, the sub controllers 100 as a whole are caused to function as the game image generation device according to the present disclosure. Game images generated for use during card games executed respectively by the sub controllers 100 are displayed on the sub displays 107 connected respectively to the sub controllers 100. As will be described below, the game images generated for use during the card games are displayed by synthesizing moving images of the dealer, which are obtained as live-action movies, with stereoscopic images.

Although not shown in the drawing, the plurality of stations 200-$n$ (the term "the stations 200" will be used hereafter to refer to the stations 200-$n$ in common) are constituted by similar computer devices to the sub controllers 100. Each station 200 comprises a touch panel display 201 and an operating unit 202. The touch panel display 201 is capable of displaying the progress of a card game executed by one of the sub controllers 100 selected by the user at the station 200. The operating unit 202 serves as input means for reflecting operations performed by the user in the card game system 1000, the operations being assumed to include touch panel operations and operations of operating buttons not shown in the drawing. When the user selects one of the sub controllers 100 by operating the operating unit 202, the game images generated for use during the card game executed by the selected sub controller 100 are displayed on the display 201. Hereafter, selecting one of the sub controllers 100 will be expressed simply as "selecting a card game".

Although not shown in the drawing, the main controller 300 is constituted by a similar computer device to the sub controllers 100. The main controller 300 is configured to be capable of monitoring the progress of the card games executed by the respective sub controllers 100 from moment to moment, and notifying the respective sub controllers 100 of game progression timings. The main controller 300 displays the game images generated for use during the card game executed by one of the sub controllers 100 in the dealer display region 301-1 of the main display 301. Further, the main controller 300 is configured to be capable of storing past outcome results of card games executed by the respective sub controllers 100, recording the past outcome results on a chart, and displaying the chart in the all table history display region 301-2 of the main display 301.

The network 400 is a communication network that connects the sub controllers 100, the stations 200, and the main controller 300 to each other. The network 400 may be constituted by a communication network that connects these components to each other either by wires or wirelessly, such as a LAN (Local Area Network), a WAN (Wide Area Network), or the Internet, but is not limited to these examples.

2. Flow of Card Game

Figure 3:
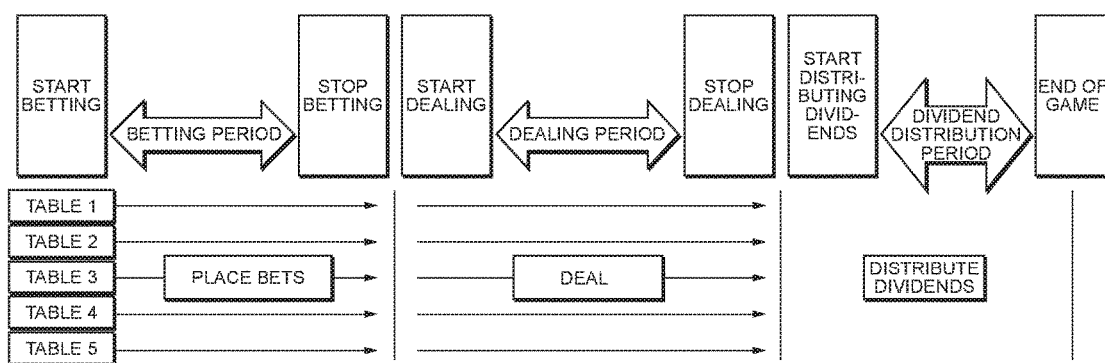
FIG. 3 is a diagram showing a flow of a card game according to this embodiment.

FIG. 3 is a diagram showing a flow of the card game implemented in the card game system 1000 according to this embodiment. As shown in FIG. 3, the card game is constituted by a single round divided broadly into three periods, namely a "betting period", a "dealing period", and a "dividend distribution period". The main controller 300 manages start and end timings of these periods, and issues instructions to the respective sub controllers 100 to start and stop the periods. For example, the betting period is set at 25 seconds, the dealing period is set at 15 seconds, and the dividend distribution period is set at 5 seconds.

One of the main features of the card game system 1000 according to this embodiment is that a plurality of card games are advanced simultaneously by the plurality of sub controllers 100, while the main controller 300 aggregates the outcome results of the card games and determines the dividends accordingly. By advancing a plurality of card games simultaneously on a plurality of virtual tables, a level of enjoyment not achieved during a conventional card game can be provided.

More specifically, a user seated at one of the stations 200 selects one of the plurality of virtual tables, and then predicts and bets on the outcome of that table. In a conventional card game, even when card games are performed on a plurality of tables, the respective games are implemented independently and dividends based on the outcome results are distributed individually in relation to the respective tables. In the card game system 1000 according to this embodiment, on the other hand, the user is not limited to the outcome result of the table selected thereby, and can (1) predict and bet on the outcomes of card games implemented on a plurality of tables simultaneously, and (2) predict and bet on the outcomes of the card games implemented on all of the tables as a whole. Note that in the following description, for convenience, predicting and betting on the outcomes of respective card games will be referred to as a "main bet", while predicting and betting on the outcomes of the five card games as a whole will be referred to as a "side bet".

Betting Period

The "betting period" is a period in which the user predicts and bet on the outcome before the cards are dealt. The user participating in the card game sits at an available station 200. During the betting period, the user predicts the outcome of one or a plurality of the five card games simultaneously in progress, and places betting chips corresponding to a betting amount in accordance with the predicted outcome by operating the operating unit 202 of the station 200. The "main bet" is when the user bets on one of the card games, and the "side bet" is when the user bets on a plurality of card games. By operating the operating unit 202, the user can select and display images of the card game executed by one of the sub controllers 100-1 to 100-5.

During the betting period, moving images of the dealers allocated the respective card games are displayed on the respective sub displays 107 of the main body 10. Further, the game images generated for use during the card game executed by one of the sub controllers 100 are displayed in the dealer display region 301-1 of the main display 301 of the main body 10. By implementing moving image connection processing to be described below, actions of the dealer displayed on the game images can be modified in response to the betting situation of the user, and different actions can be depicted in each round.

Dealing Period

The "dealing period" is a period following the betting period, during which the user is prohibited from placing bets, and cards are distributed by each sub controller 100 in order to advance the card game. During the card game, two or three cards are distributed (in other words, "dealt") to each of the banker side and the player side. The sub controller 100 determines whether to distribute two cards or three cards to each side during each round using random numbers or the like. The sub controller 100 then determines numerical values of the cards in accordance with the number of distributed cards.

Dividend Distribution Period

The "dividend distribution period" is a period following the dealing period, in which dividends are paid out in accordance with the betting situation of the user. When the outcome of the card game is determined during the dealing period, the dividend of the main bet is determined. Further, when the user has placed a side bet, the dividend of the side bet is also determined. Dividends are then paid out to the respective stations 200 in accordance with the determined dividends, whereby a single round of the card game is completed.

3. Configuration and Operations of Sub Controller 100

Figure 4:
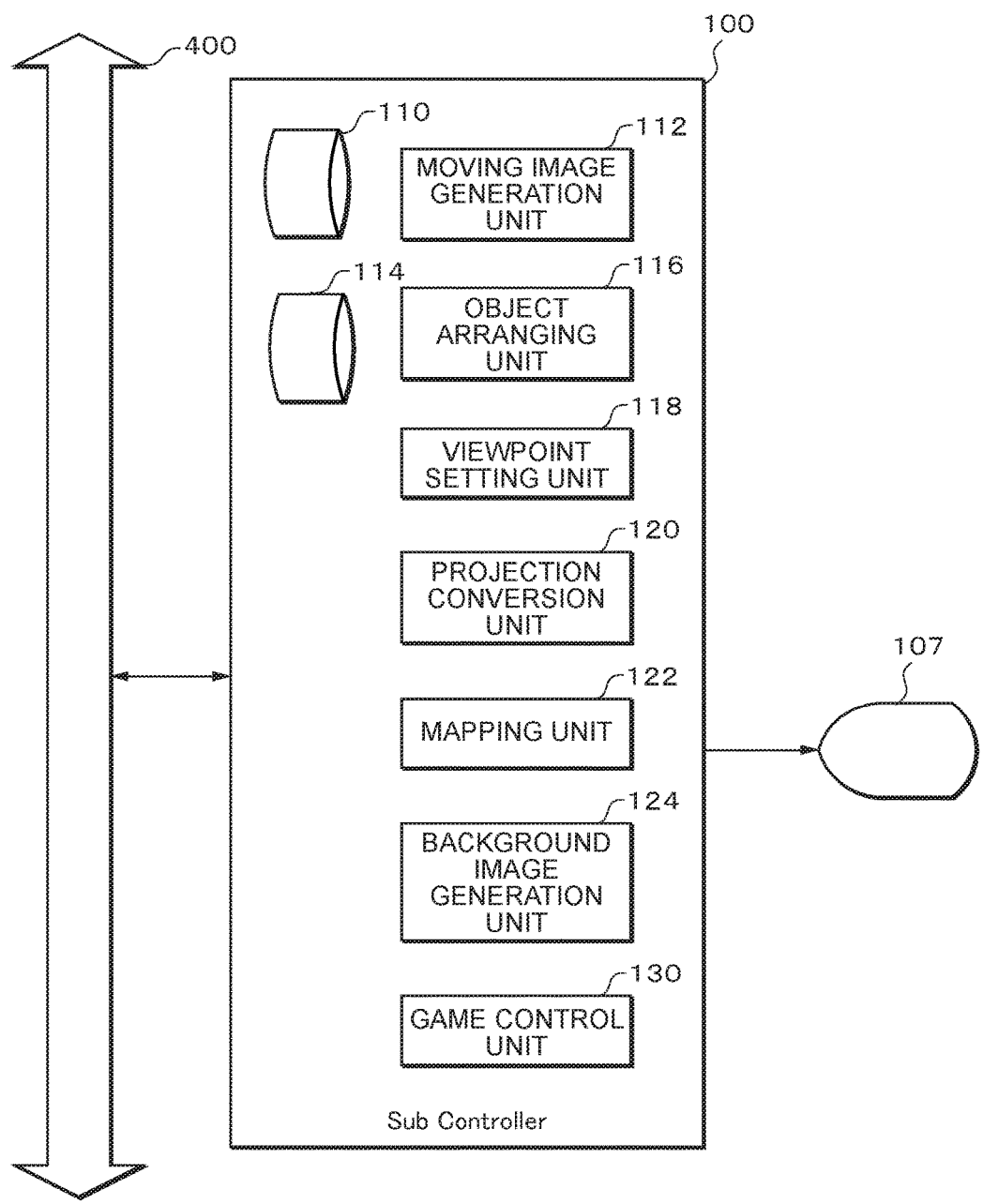
FIG. 4 is a block diagram showing a sub controller (a game image generation device) according to this embodiment.

FIG. 4 is a block diagram showing the sub controller (the game image generation device). The respective function blocks shown in FIG. 4 are realized as functions by having the CPU 101 of the sub controller 100 execute the game image generation program according to the present disclosure. The manner in which the respective function blocks are represented and the divisions therebetween have been conceived to facilitate description, and the function blocks may be represented and divided in a different manner to the example shown here. For example, a plurality of the function blocks may be grouped into a single block, and a single function block may be divided into a plurality of blocks.

As shown in FIG. 4, by having the CPU 101 execute the game image generation program according to the present disclosure, the sub controller 100 operates as a game image generation device having a functional configuration that comprises a moving image generation unit 112, an object arranging unit 116, a viewpoint setting unit 118, a projection conversion unit 120, a mapping unit 122, a background image generation unit 124, and a game control unit 130. Further, the ROM 102, the RAM 103, and the hard disk 105 of the sub controller 100 are divided functionally between a moving image storage unit 110 and an object image storage unit 114.

3-1. Principle of Method of Connecting Moving Images by Morphing Processing

Moving image information used to generate moving images having the dealer as the subject is stored in the moving image storage unit 110. The moving image generation unit 112 is a function block for generating a moving image by reading the moving image information. The moving image generation unit 112 connects a plurality of different moving images stored in the moving image storage unit 110 on the basis of a principle to be described below.

The moving images according to this embodiment are obtained by filming and recording a plurality of different actions performed by a model dressed as an actual, real-life dealer serving as the subject. The actions recorded on a single moving image range from short, simple actions lasting a few seconds, such as "nodding" and "waving", to longer actions lasting up to approx. ten seconds, such as dealing several cards. Types of moving images will be described below.

Figure 5:
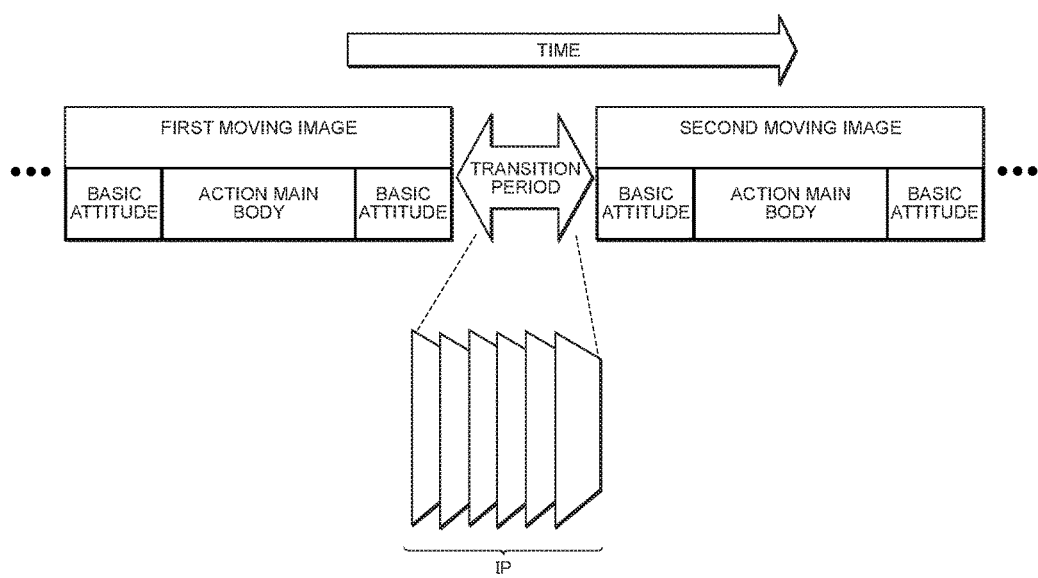
FIG. 5 is a conceptual diagram illustrating a method of connecting moving images by morphing processing according to this embodiment.

Referring to FIG. 5, the moving image information and the method of connecting a plurality of moving images by morphing processing according to this embodiment will now be described. As shown in FIG. 5, each moving image is constituted by a "moving image main body" in which an action performed by the subject is recorded, and a "basic attitude" serving as a header part and an ending part before and after the moving image main body. The "basic attitude" is an identical reference attitude adopted by the subject before and after a specific action in all of the moving images. The "basic attitude" is preferably a stable attitude that a real-life human being finds easy to adopt, and therefore an attitude in which the subject is unlikely to wobble, such as placing both hands in a fixed position on the table, for example, is applied. The "basic attitude" acts as a "margin" by which different moving images are connected. The "basic attitude" is recorded for a fixed brief time period, for example one second.

A plurality of different moving images are connected to each other by the "basic attitude" part serving as the "margin". Although the "basic attitude" is always the same, the "basic attitude" is adopted by the real-life model before and after the "action main body" every time an action is performed, and therefore the attitude (the manner in which the hands and fingers are bent, the incline of the body, and so on) and facial expression of the model, as well as creases in his or her clothes and so on, vary slightly. When different "basic attitudes", during which such slight variation is inevitable, are connected directly, the attitude and facial expression of the model as well as the creases in his or her clothes and so on vary instantaneously, causing obvious discontinuity in the reproduced image, and as a result, the viewer feels uncomfortable.

Hence, in this embodiment, discontinuity is mitigated by applying a morphing technique to connect different "basic attitudes". A morphing technique is typically a special effects technique in which the shape of a single object is varied gradually so that the object changes into another object having a completely different shape over a fixed time period. In this embodiment, meanwhile, morphing is applied in order to connect the "basic attitude" of a moving image played first to the "basic attitude" of a moving image played next over a transition period. Morphing processing is used to connect deviations in the attitude of the live-action model, which inevitably occur between the "basic attitudes" of different moving images, naturally by varying the attitude gradually over the transition period so that even when different moving images are filmed separately, the viewer sees a single image that appears to have been filmed continuously.

More specifically, as shown in FIG. 5, an interpolation image IP between the "basic attitude" of a first moving image and the "basic attitude" of a second moving image is played during the transition period. The interpolation image IP is a group of frame images generated by performing a linear interpolation calculation on a frame image in which the "basic attitude" of the first moving image is reproduced and a frame image in which the "basic attitude" of the second moving image is reproduced. When the transition period is set at one second (30 frames), for example, pixels displaying the "basic attitude" of the first moving image transition to pixels displaying the "basic attitude" of the second moving image over 30 frame images. The interpolation image IP is created in advance, stored in the moving image storage unit 110, called up, inserted between the first moving image and the second moving image, and played. Note, however, that when the game image generation device has a superior image processing capability, the frame images constituting the interpolation image IP may be generated successively in real time and inserted between the first moving image and the second moving image.

When the number of frames of the transition period is set as F, pixel data for displaying the "basic attitude" of the first moving image are set as p1, and pixel data for displaying the "basic attitude" of the second moving image are set as p2, pixel data pn of an n-th frame ($1 \leq n \leq F$) of the interpolation image IP are calculated using the following general formula:

$$pn=[(F-n) \times p1 + n \times p2]/F.$$

Note that the transition period does not necessarily have to be provided. To connect two moving images within a minimum time period, the period in which the "basic attitude" is adopted may be used as the transition period of the morphing processing. For example, by connecting the frame image corresponding to the timing at which the model enters the "basic attitude" in the ending part of the first moving image to the frame image corresponding to the timing at which the model terminates the "basic attitude" in the header part of the second moving image by morphing processing, the transition period required to connect the first moving image to the second moving image can be minimized to the length of the period in which the "basic attitude" is adopted.

Further, in the present disclosure, the "basic attitude" does not necessarily have to be provided in the "moving image". The reason for this is that morphing processing is a technique applied to subjects (set as a first subject and a second subject) originally having completely different attitudes and forms in order to change the first subject into the second subject while gradually varying the attitude and form thereof, and therefore, even when the attitude of the subject (the dealer) at the end of the first moving image is different to the attitude of the subject at the end of the second moving image, the two moving images can be connected by gradually varying the attitude. Note, however, that when different attitudes are connected using a morphing technique, variation in the attitude interpolated linearly over the transition period is displayed, and therefore the fact that morphing processing is underway becomes obvious. Hence, to ensure that the displayed moving image appears to have been filmed continuously and the viewer does not realize that a plurality of moving images have been connected by morphing processing, the morphing processing is preferably implemented between the "basic attitudes" of two moving images.

3-2. Method of Creating Moving Image

Figure 6A:
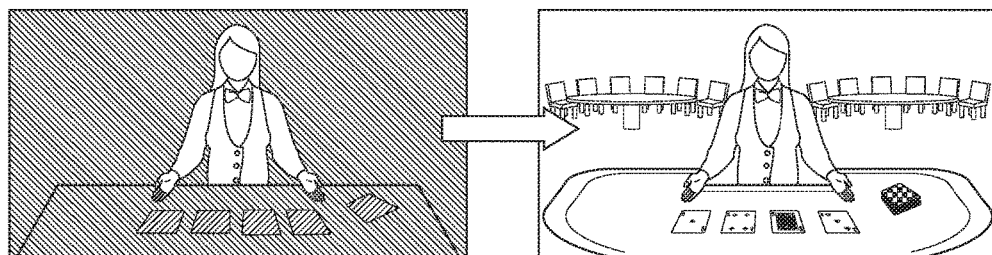
FIG. 6A is a (first) illustrative view showing chroma key processing implemented when filming a moving image, according to this embodiment.

A method of creating a moving image according to this embodiment will now be described on the basis of FIG. 6A and FIG. 6B. A drawing on the left side of FIG. 6A shows an extracted frame image obtained by filming the model dressed as the dealer adopting the "basic attitude", and a drawing on the right side of FIG. 6A is a stereoscopic image generated by projection-converting a moving image obtained by implementing chroma key processing on the image shown in the drawing on the left side of FIG. 6A together with objects. A drawing on the left side of FIG. 6B shows an extracted frame image obtained by filming the model dealing cards, and a drawing on the right side of FIG. 6B is a stereoscopic image generated by projection-converting a moving image obtained by implementing chroma key processing on the image shown in the drawing on the left side of FIG. 6B together with objects.

Figure 6B:
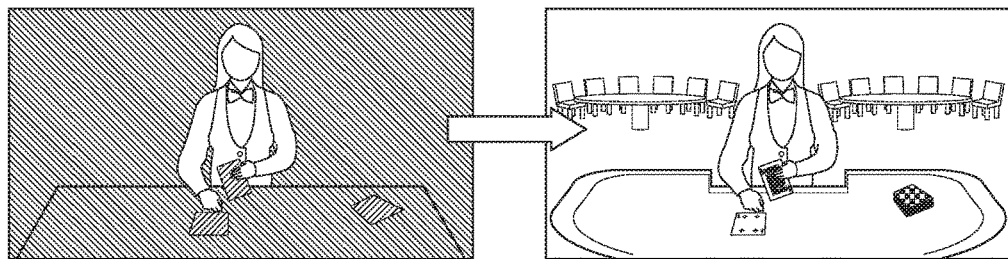
FIG. 6B is a (second) illustrative view showing the chroma key processing implemented when filming a moving image according to this embodiment.

As shown in the drawings on the left sides of FIG. 6A and FIG. 6B, the moving image is created by filming the model from a predetermined filming viewpoint while the model handles colored cards colored a specific color on a colored table colored the same specific color using the same specific color as a background. The specific color is a plain color that can be cut out of an image by chroma key processing following filming. When a human being remains as the moving image, a plain color having a tone that differs greatly from skin color, for example green, blue, or the like, is selected.

The filming viewpoint is preferably fixed even when moving images of different actions are filmed. The reason for this is that even though the table and the cards of the specific color are removed from the moving image by the chroma key processing, when the position of the filming viewpoint changes, a boundary position of a waist portion of the model, which is cropped by the table, and the size of the model vary.

A single moving image is created by filming the model continuously from the "basic attitude" serving as the header part through the action serving as the "action main body" to the "basic attitude" serving as the ending part. The model preferably holds the "basic attitude" for a predetermined time period without moving. As shown in the drawing on the left side of FIG. 6B, when actions such as dealing out and clearing away the cards are filmed, a card held by the model may overlap a part of the body of the model from the filming viewpoint. In this case, the specific color of the card is cut out by the chroma key processing, and therefore the part where the card overlaps the body of the model is also cut out, as shown in the drawing on the left side of FIG. 6B. As a result, a moving image from which a part of the body of the model has been extracted in alignment with the shape of the card is obtained following the chroma key processing.

The chroma key processing is implemented using a special effects device (a switcher) or the like on the moving image filmed using the specific color for the background, and as a result, the specific color is removed such that only the part of the image showing the model dressed as the dealer remains. The moving image subjected to the chroma key processing forms the moving image information recorded in the moving image storage unit 110. Synthesis processing to be described below is then performed to synthesize a stereoscopic image and a background image with the moving image, whereby the moving image is displayed as an image showing a dealer handling cards in an actual hall, as shown in the drawings on the right sides of FIG. 6A and FIG. 6B.

3-3. Processing for Synthezising Moving Image with Stereoscopic Image

Next, processing for synthesizing the moving image created in the manner described above with a stereoscopic image will be described with reference to FIG. 7, which is a conceptual diagram showing an object arrangement on a world coordinate system.

Figure 7:
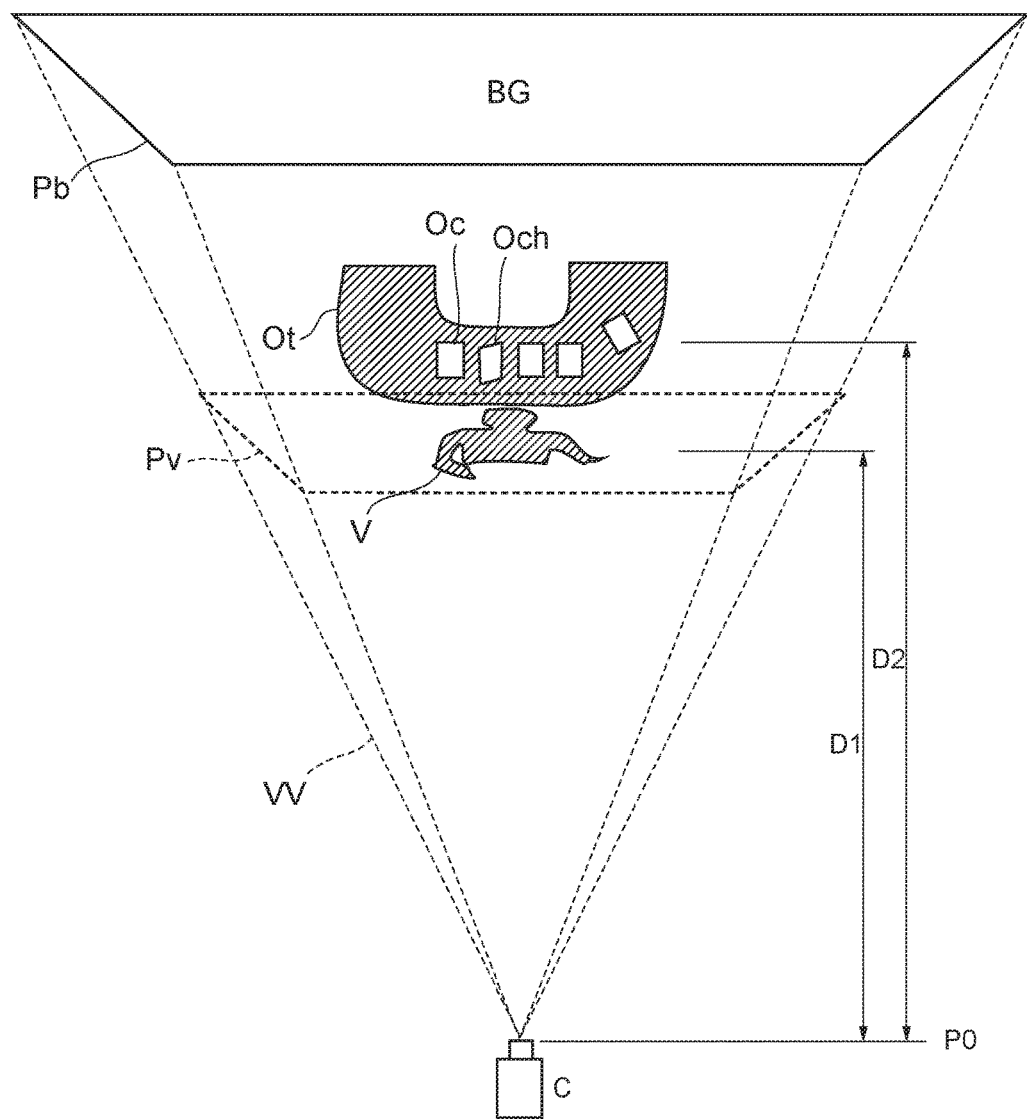
FIG. 7 is a conceptual diagram showing an object arrangement on a world coordinate system.

As shown in FIG. 7, a viewpoint C from which a stereoscopic image is to be generated is set on a world coordinate system, or in other words in a virtual three-dimensional space. A view volume VV is a space in which the image is to be formed within the world coordinate system. The view volume VV is set as a quadrangular pyramid having the viewpoint C as a vertex and extending to a background plane Pb onto which a background image BG is projected. A moving image plane Pv is a plane on which a moving image V reproduced from the moving image information is mapped. In this embodiment, as shown in FIG. 7, the moving image plane Pv, card objects Oc and a table object Ot, and the background plane Pb are disposed in that order from a point closest to the viewpoint C. A card object Och is an object defining a card that is held by the dealer, who is represented by the moving image V, so as to be positioned at a remove from a table surface of the table object Ot within the virtual three-dimensional space. A distance D2 from the viewpoint C to the card objects Oc (Och) and the table object Ot is greater than a distance D1 from the viewpoint C to the moving image plane Pv on which the moving image V is mapped.

Information relating to objects defined on a modeling coordinate system disposed within the world coordinate system is stored in the object image storage unit 114 shown in FIG. 4. Information relating to textures that are mapped onto objects projected in perspective is also stored in the object image storage unit 114. More specifically, as shown in FIG. 7, the object image storage unit 114 stores modeling information and texture information relating to the card objects Oc and the table object Ot disposed within the view volume VV.

The object arranging unit 116 is a function block that defines the modeling information stored in the object image storage unit 114 in relation to the card objects Oc (Och) and the table object Ot on the world coordinate system by subjecting the modeling information to modeling conversion. In other words, the object arranging unit 116 arranges the card objects Oc (Och) and the table object Ot on the world coordinate system.

As shown in FIG. 7, the moving image plane Pv is disposed on the near side of the viewpoint C while the card objects Oc (Och) are disposed on the far side of the viewpoint C, and therefore, when the moving image V and one of the card objects Oc (Och) overlap, the card object Oc (Och) is hidden by the moving image V at all times. Accordingly, as regards the card held in the hand of the dealer, the part of the card object Och that is overlapped by the hand when the hand is viewed from the viewpoint C is hidden by the part of the moving image V that corresponds to the hand, and as a result, an image of the dealer holding the cards is expressed naturally.

Further, as shown in the drawing on the left side of FIG. 6B, when the card overlaps a part of the body of the dealer other than the hand (the waist portion, for example), this part of the body of the dealer is cut out in the shape of the card by the chroma key processing described above such that the moving image V comprises a corresponding cutout portion. Accordingly, the card object Och disposed on the far side of the viewpoint C is viewed through the cutout portion of the moving image V disposed on the near side. Therefore, as shown in the drawing on the right side of FIG. 6B, a projection-converted image on which the card appears to be in front of the dealer even though the card object Och is disposed on the far side is obtained, and as a result, a sense of artificiality is not imparted.

The viewpoint setting unit 118 is a function block for setting a relative position of the viewpoint C on the world coordinate system so as to correspond to a relative position of the filming viewpoint from which the moving image V is filmed. More specifically, the viewpoint setting unit 118 sets the viewpoint C of the virtual three-dimensional space in a position on the world coordinate system that corresponds to a relative positional relationship that was established between the filming viewpoint and the colored cards when creating the moving image by filming the model. By setting the viewpoint C in this manner, positional relationships between the moving image V of the of the dealer, the table object Ot, and the card objects Oc (Och) when viewed from the viewpoint C can be set to be identical to positional relationships between the model, the colored table, and the colored cards during filming of the moving image.

The projection conversion unit 120 is a function block that redefines the objects on a viewpoint coordinate system by implementing viewing conversion on the objects defined on the world coordinate system using the viewpoint C from which the relative positions are determined as a reference, and projects the redefined objects onto a predetermined view plane. As a result of this processing, the card objects Oc (Och) and the table object Ot arranged within the view volume VV are projected in perspective onto the view plane.

The mapping unit 122 is a function block that reads the texture information stored in the object image storage unit 114 and maps textures onto the table object Ot and the card objects Oc projected in perspective. Further, the mapping unit 122 reads the moving image information stored in the moving image storage unit 110, and maps the moving image V onto the moving image plane Pv.

Figure 8:
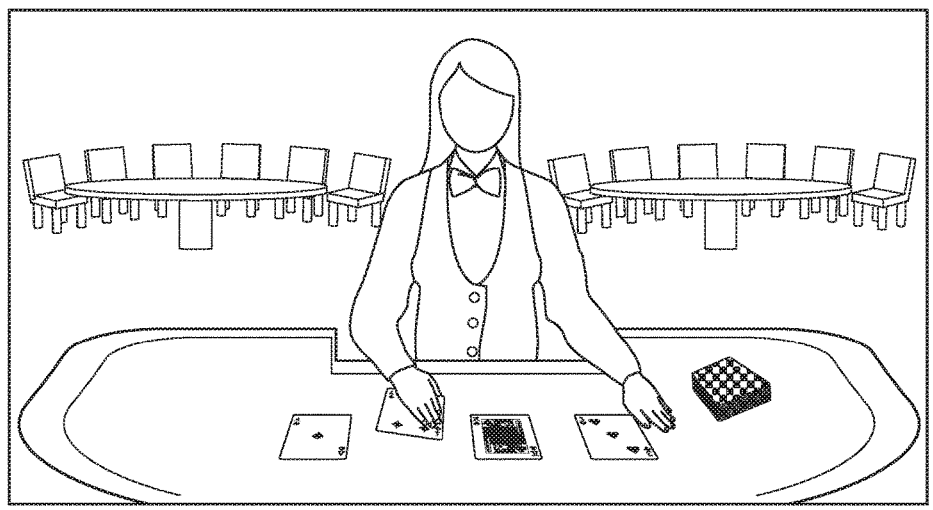
FIG. 8 is an example of an image display obtained from the object arrangement shown in FIG. 7.

FIG. 8 is an example of an image display generated in accordance with the object arrangement shown in FIG. 7. The background image BG is disposed behind all of the images, and does not therefore overlap any of the objects. The dealer of the moving image V is disposed on the near side of the table object Ot and the card objects Oc, and therefore an unnatural image on which a part of the body of the dealer is hidden behind the table from the viewpoint C is not generated. Moreover, when the card object Och held by the dealer overlaps a part of the body of the dealer, a cutout portion is formed in the overlapping part of the moving image V by the chroma key processing, and therefore the card object Och disposed on the far side is viewed through the moving image V from the viewpoint C, with the result that an unnatural image on which the part of the card that overlaps the part of the body of the dealer cannot be seen is not generated. By implementing processing to synthesize the moving image with a stereoscopic image in this manner, a highly attractive image that fuses a live-action moving image and a stereoscopic image without a sense of artificiality, as shown in FIG. 8, can be presented.

3-4. Enlargement Processing

The game control unit 130 is configured to enlarge the display of the dealt cards when a request for enlarged display is issued from the operating unit 202 of one of the stations 200. Either a stereoscopic image enlarged display mode, in which the card objects Oc (Och) are enlarged in the form of stereoscopic images, or a planar image enlarged display mode, in which the cards are enlarged in the form of two-dimensional images, may be selected as the enlarged display.

Figure 9:
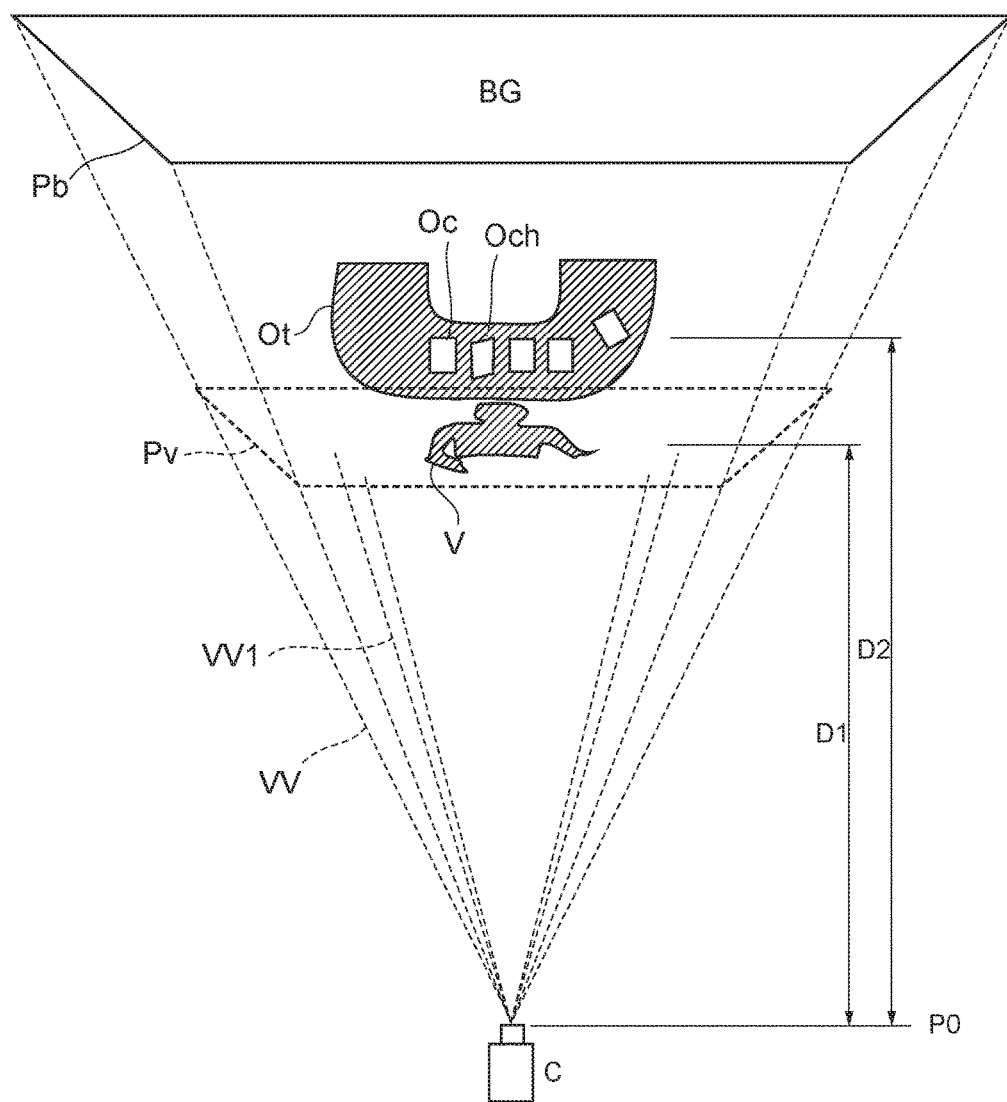
FIG. 9 is a conceptual diagram showing an object arrangement in a case where enlargement processing is performed using stereoscopic images, according to this embodiment.

When the user requests the stereoscopic image enlargement mode from the station 200, the game control unit 130 controls the viewpoint setting unit 118 such that a sight line from the viewpoint C is oriented toward the card objects Oc (Och) without moving the position of the viewpoint C set on the world coordinate system as shown in FIG. 7, and a viewing angle (an angle of view) is modified to a narrow angle centering on the card objects Oc (Och), as shown in FIG. 9.

In other words, when the stereoscopic image enlargement mode is requested, the game control unit 130 modifies the viewing angle (the angle of view) from the wide viewing angle employed while the display is not enlarged to a narrow viewing angle centering on the card objects Oc (Och). In response to this processing, the projection conversion unit 120 subjects each object included in a view volume VV1 defined by the narrow viewing angle to viewing conversion, with the result that a part of the moving image V and respective parts of the enlarged card objects Oc (Och) and table object Ot are projected in perspective onto a new view plane used for enlarged display. When enlarged display is cancelled, the game control unit 130 modifies the narrow viewing angle corresponding to the view volume VV1 to the wide viewing angle corresponding to the view volume VV.

FIG. 10 shows an example of an image display obtained in the stereoscopic image enlarged display mode. In the stereoscopic image enlarged display mode, as shown in FIG. 10, only a limited range centering on the card objects in front of the dealer is displayed in accordance with the narrow viewing angle, and the background image BG is not displayed. As a result of this processing, an image combining a realistic moving image with stereoscopic images can be presented likewise in the stereoscopic image enlarged display mode.

Further, when the user requests the planar image enlargement mode from the station 200, the game control unit 130 reads planar images (sprite images) of the cards instead of stereoscopic images, and displays the simple planar images. These planar images can be generated by referring to the mapping information stored in the object image storage unit 114.

FIG. 11 shows an example of an image display obtained in the planar image enlarged display mode. In the planar image enlarged display mode, as shown in FIG. 11, simple images in which card textures alone are disposed on a background colored the same color as the table are displayed, and the dealer of the moving image V is not displayed. As a result of this processing, simple images from which the values of the dealt cards can be identified easily can be presented.

3-5. Background Modification Processing

In this embodiment, card games are played respectively on a plurality of tables disposed in a large space, and calculations can be performed to modify a sight line direction at will in order to shift the sight line to a desired table.

Figure 12:
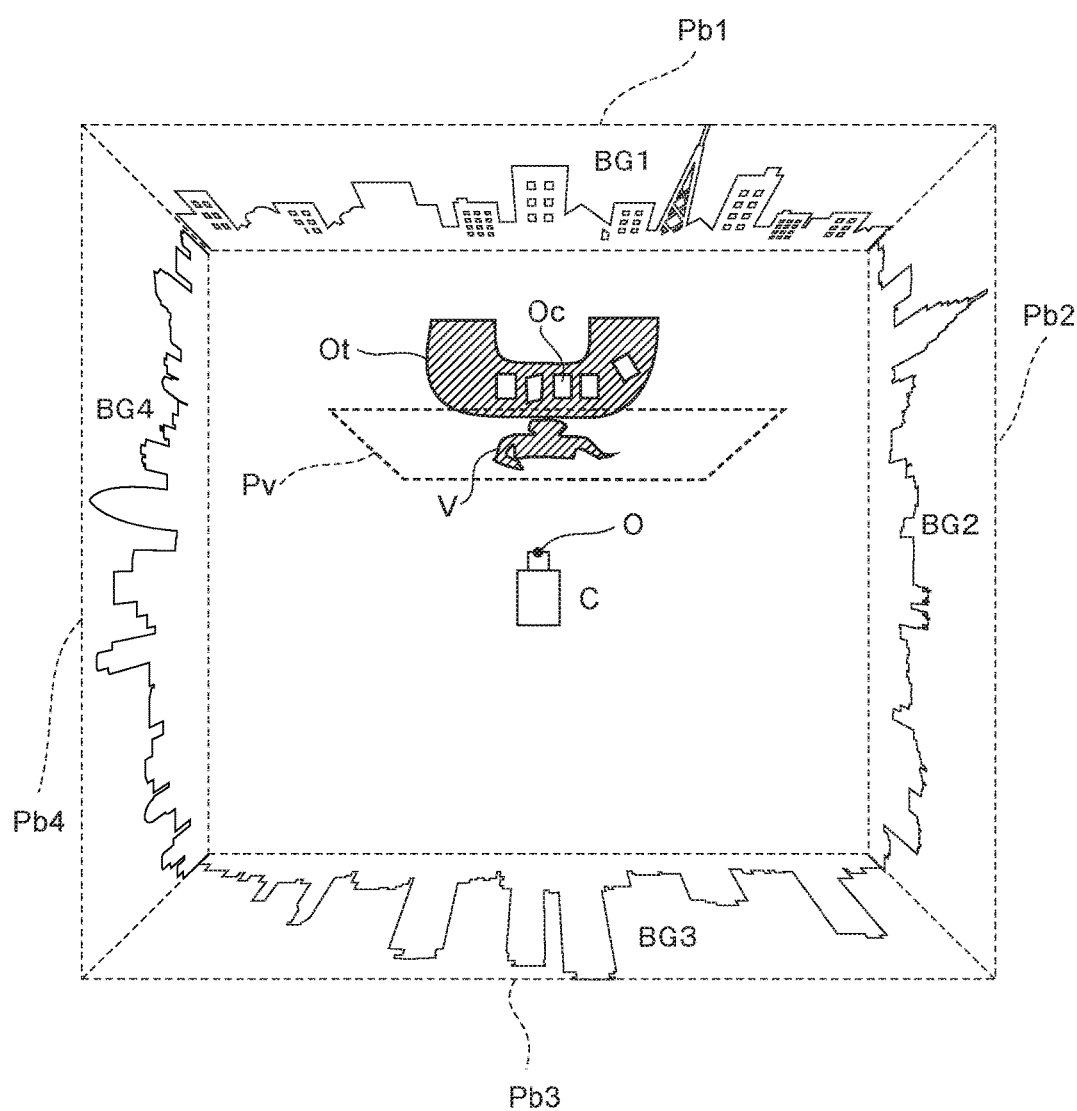
FIG. 12 is a conceptual diagram showing a background image arrangement on the world coordinate system, according to this embodiment.

FIG. 12 is a conceptual diagram showing a background image arrangement on the world coordinate system, according to this embodiment. In this embodiment, the background image generation unit 124 disposes the background image in the form of a regular hexahedron constituted by six planes (background planes) on which background images are respectively mapped so that the background image surrounds the viewpoint C, the moving image plane Pv, and the group of objects. Four background planes Pb1 to Pb4 on which background images BG1 to BG4 are respectively mapped are arranged in FIG. 12 (to facilitate understanding, FIG. 12 does not show the background planes serving as a bottom surface and a top surface). The background images BG1 to BG4 mapped on the plurality of background planes Pb1 to Pb4 are set to be pictorially continuous. As described above using FIG. 7, the viewpoint C, the moving image plane Pv, the card objects Oc, and the table object Ot are arranged in the interior of the background planes Pb1 to Pb4. At this time, although the sight line direction is modified at will, the position of the viewpoint C is fixed at a geometrical center point O of the regular hexahedron formed by the background planes Pb1 to Pb4. In other words, modification of the relative position of the viewpoint C relative to the moving image V, the card objects Oc, the table object Ot, and the like on the world coordinate system is prohibited.

Figure 13:
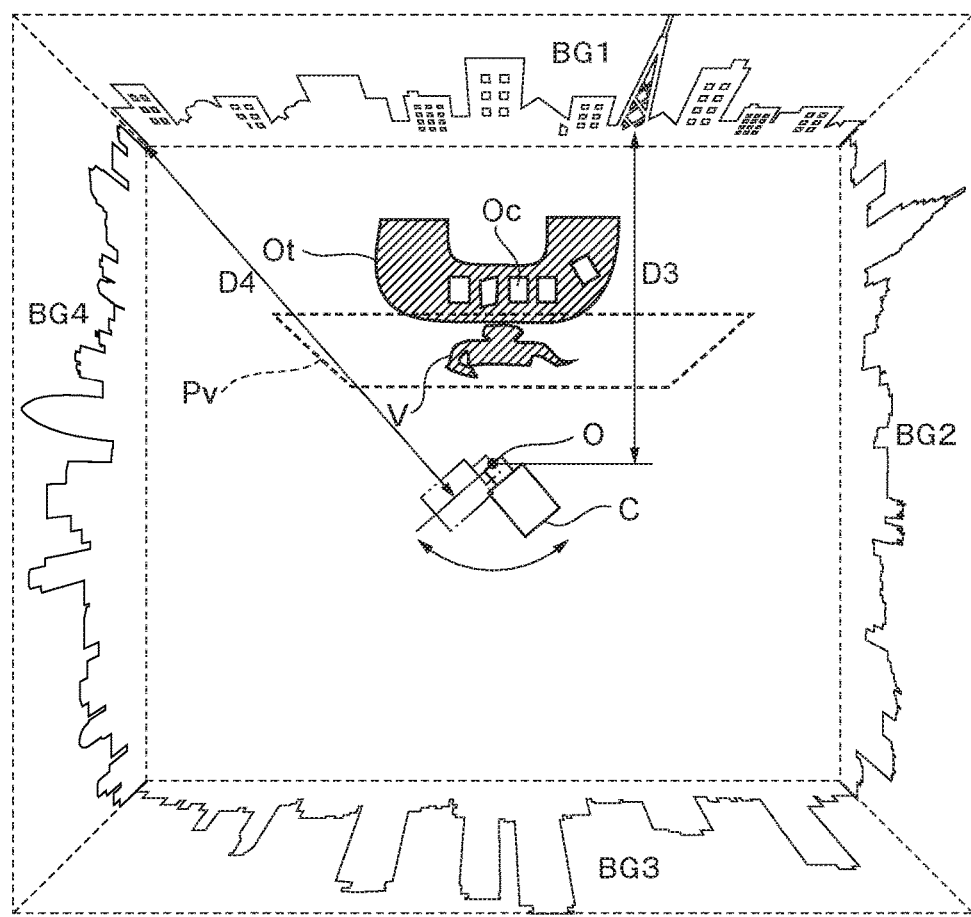
FIG. 13 is a conceptual diagram illustrating modification of a sight line direction.

FIG. 13 is a conceptual diagram illustrating a case in which the sight line direction is modified. In this embodiment, as shown in FIG. 13, the position of the viewpoint C within the virtual three-dimensional space remains fixed at the center point O even when the sight line direction is modified, and therefore distances from the viewpoint C to the moving image plane Pv, the card objects Oc, and the table object Ot do not vary regardless of the viewing direction from the viewpoint C. As a result, positional deviation does not occur between the moving image V and the objects.

Disposing the viewpoint C in this manner is particularly effective in a system where a plurality of card games are executed in parallel simultaneously, as in this embodiment. For example, a plurality of card game sets, each constituted by the moving image plane Pv, the card objects Oc, and the table object Ot, are arranged around the viewpoint C within the regular hexahedron constituted by the background planes (to facilitate understanding, only one card game set is shown in FIG. 12 and FIG. 13). With this arrangement, by performing control to rotate only the sight line direction while keeping the position of the viewpoint C fixed, an image on which a camera appears to pan from one table to another can be generated. By moving the sight line continuously from the single fixed viewpoint C to a plurality of different tables provided in the same virtual three-dimensional space, the displayed card games can be modified in a flowing motion. Further, by shifting the sight line instantaneously from one table to another, the displayed card game can be modified instantaneously.

Furthermore, in this embodiment, which comprises the five sub controllers 100, the virtual three-dimensional space and the display objects may be shared among the plurality of sub controllers 100 such that five card game sets, each constituted by the moving image V, the card objects Oc, and the table object Ot, are modeled within a single virtual three-dimensional space and the individual sub controllers 100 respectively generate images projected in perspective by orienting the sight line direction toward different card game sets from the shared viewpoint C.

Note that when the sight line direction is modified in a case where the card game sets are surrounded by the plurality of background planes, as shown in FIG. 12 and FIG. 13, the relative sizes of the background images vary in accordance with the distance between the viewpoint C and the background image. When an irregular image such as a night scene is used, the sense of artificiality is small, but when geometrically symmetrical graphics are disposed on the background image, an unnatural image on which the graphics expand and contract as the background plane rotates is likely to be obtained. It is therefore preferable to map images that have been processed such that the background images mapped onto the respective background planes are enlarged in accordance with variation in the distance thereof from the viewpoint C. As shown in FIG. 13, for example, when a distance between the viewpoint C and the background plane near the center of a background plane that is perpendicular to the sight line from the viewpoint C is set as D3, a distance D4 from the viewpoint C to an intersection between the sight line and the background plane increases gradually as the sight line direction is rotated such that the sight line approaches a corner of the regular hexahedron shape constituted by the background planes. Therefore, images on which the background images are gradually enlarged toward peripheral portions of the background planes in accordance with a ratio D4/D3 between these distances are mapped. By mapping the images in this manner, an apparent reduction in the sizes of the background images corresponding to the distance thereof from the viewpoint C appears to be canceled out by the background images that are enlarged in accordance with the distance thereof from the viewpoint C. As a result, background images having a uniform size can be presented regardless of the direction in which the sight line is oriented.

Figure 14:
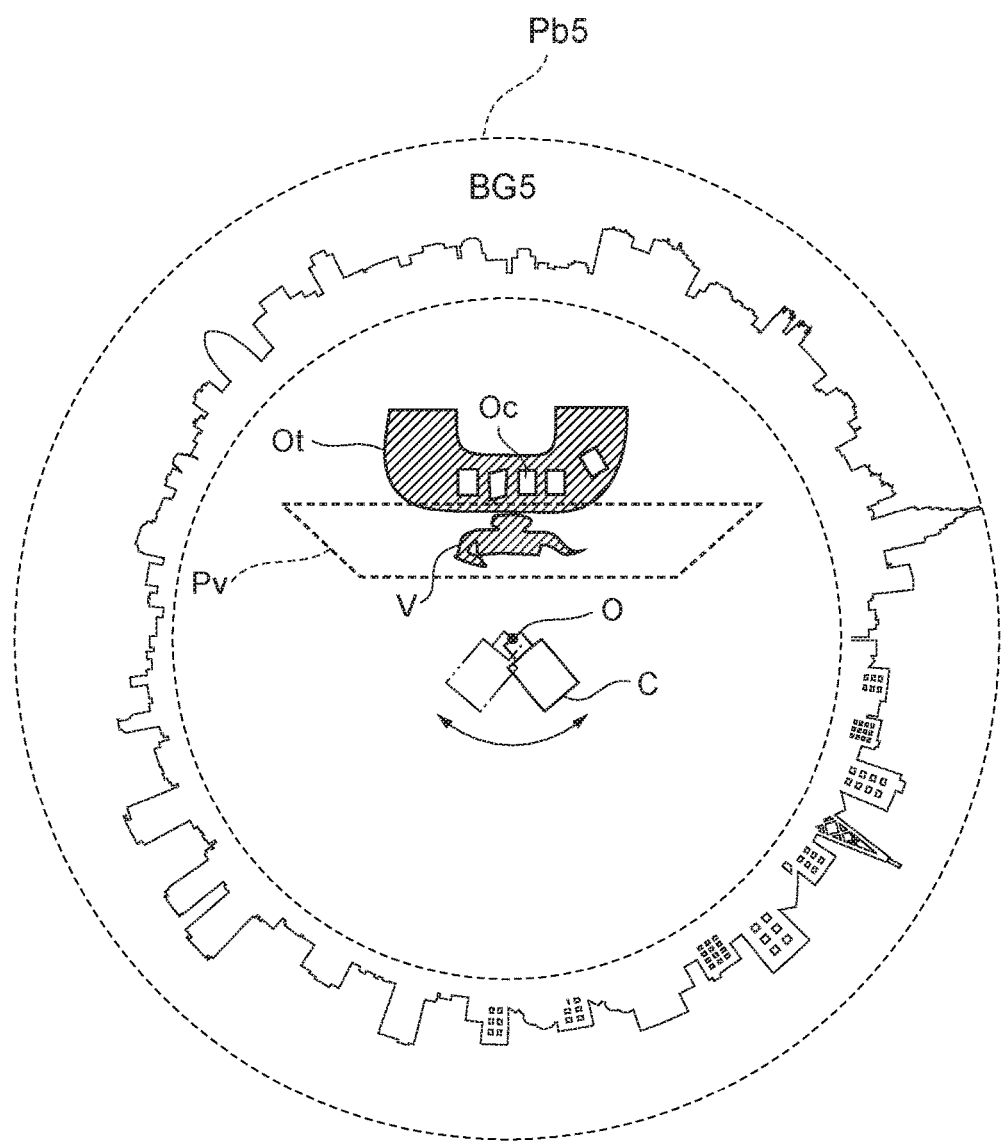
FIG. 14 is a conceptual diagram showing a background image arrangement on the world coordinate system according to a modified example.

FIG. 14 is a conceptual diagram showing a background image arrangement on the world coordinate system according to a modified example. As a modified example, the background image generation unit 124 may map background images onto a spherical shape or a cylindrical shape so as to surround the viewpoint C, the moving image plane Pv, and the group of objects. FIG. 14 shows a condition in which background planes are mapped onto an inner wall of a cylindrical shape. As shown in FIG. 14, a background plane Pb5 is formed in a cylindrical shape, and a single continuous background image BG5 is mapped thereon. When the background plane Pb5 is formed in this manner, the distance from the viewpoint C to the background plane Pb5 does not vary regardless of the direction in which the sight line is oriented, and therefore the orientation of the sight line can be varied without performing special processing to enlarge the background images.

Note that in a case where the background plane is mapped onto a cylindrical shape, the background image can be generated comparatively easily, and the background image can be displayed even when the sight line is moved 360° in a horizontal direction. In a case where the background plane is mapped onto a spherical shape, the background image can be displayed when the sight line is moved in any direction, i.e. up, down, left, or right, and therefore this configuration is ideal.

4. Card Game Operation Sequence

Figure 15:
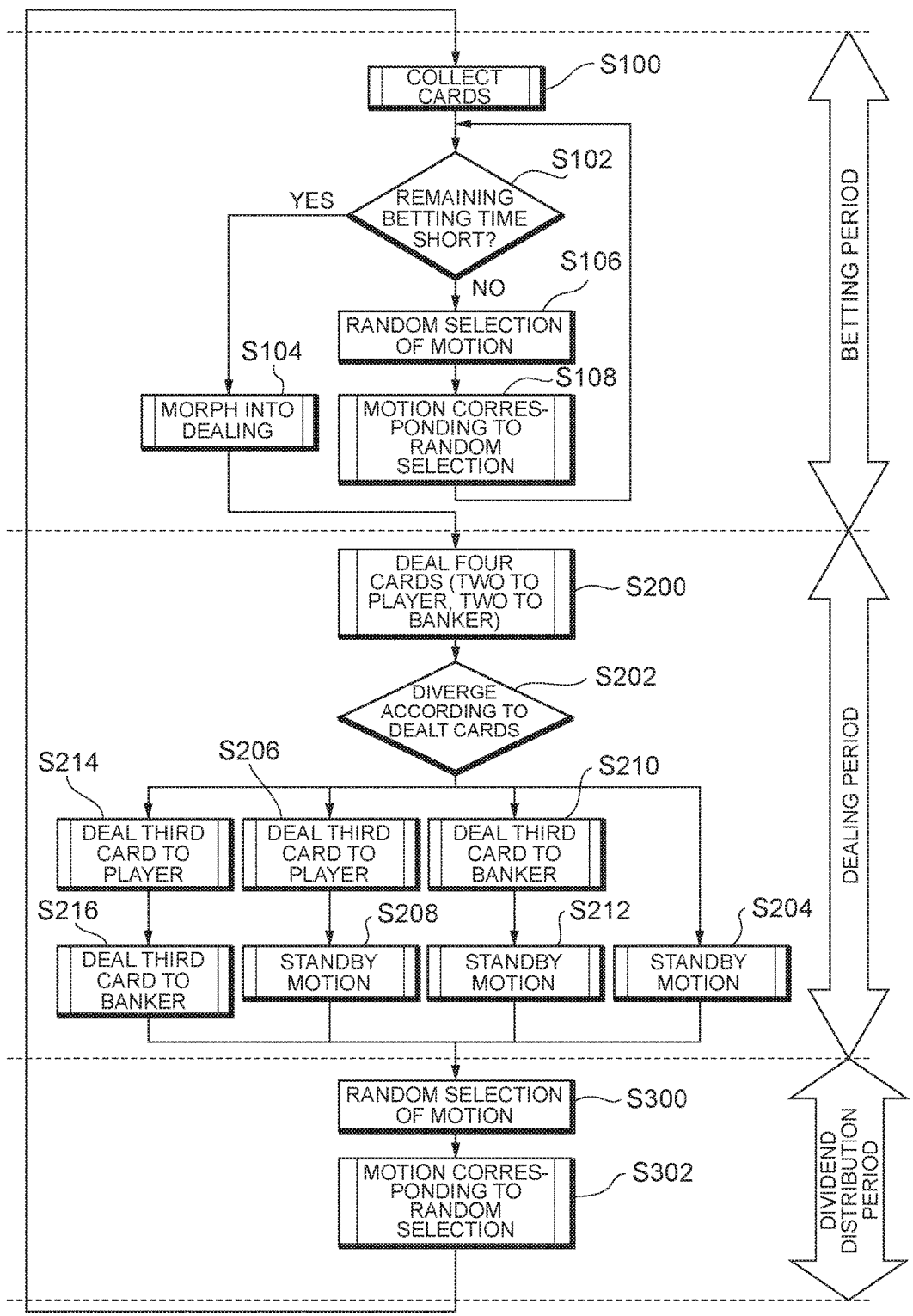
FIG. 15 is a flowchart showing an example of a game image generation method according to this embodiment.

FIG. 15 is a flowchart showing an example of a game image generation method according to this embodiment. The flowchart shown in FIG. 15 is executed by the control of the game control unit 130, which serves as a function block for controlling the progress of the card game, and as indicated above in the brief description of the game sequence using FIG. 3, is constituted by three stages, namely the betting period (steps S100 to S104), the dealing period (steps S200 to S216), and the dividend distribution period (steps S300 to S302).

The plurality of moving images generated in the steps described below are displayed after being connected by the morphing processing described above. Even when the morphing processing is not mentioned specifically, it is assumed that the morphing processing is implemented to connect the moving images.

Betting Period

A new round of the card game starts from the betting period. First, in step S100, a moving image is displayed showing the cards dealt out during the previous round of the game being collected.

Table 1 shows the types of moving images prepared in relation to card collection. The table shows a moving image number, a play time of the moving image, a number of frames required to play the moving image (at a rate of 30 frames per second), a description of the content of the action, a condition for playing the moving image when such a condition exists, and "N/A" when no such condition exists.

TABLE 1

| Moving image no. | Time [sec] | Number of frames | Action | Condition |
| --- | --- | --- | --- | --- |
| 1-1 | 6 | 180 | Clearing (two cards on banker side, two cards on player side) | N/A |
| 1-2 | 6 | 180 | Clearing (two cards on banker side, three cards on player side) | N/A |

TABLE 1-continued

| Moving image no. | Time [sec] | Number of frames | Action | Condition |
|---|---|---|---|---|
| 1-3 | 6 | 180 | Clearing (three cards on banker side, two cards on player side) | N/A |
| 1-4 | 6 | 180 | Clearing (three cards on banker side, three cards on player side) | N/A |

As shown on Table 1, a plurality of types of moving images showing the cards being collected are prepared in accordance with the numbers of cards dealt respectively to the banker side and the player side in the previous round of the game. The game control unit 130 selects a corresponding moving image from the four moving images by referring to the progress of the game, and prompts the moving image generation unit 112 to read and reproduce the moving image information selected from the moving image storage unit 110.

Next, in step S102, a determination is made as to whether or not the remaining betting period is short. The remaining betting period may be set as desired, for example at a specific number of remaining seconds or a period of 5 to 10% of the entire betting period.

When the remaining betting period is sufficiently long (S102: NO), the routine advances to random selection of a motion (an action taken by the dealer) (step S106), and a moving image corresponding to the random selection is displayed (step S108). When the remaining betting period is short (S102: YES), morphing processing is executed in order to advance to the dealing period (step S104), whereupon the routine advances to step S200, where moving images used during the dealing period are played.

During the betting period, the dealer does not handle the cards, and therefore the actions of the dealer must be varied randomly to prevent the display of a monotonous image that shows identical repeated actions and appears to have been created mechanically by a computer. Accordingly, the game control unit 130 performs an operation to execute a random selection using a random number or the like as required at the timing at which reproduction of one moving image ends, and select one set of moving image information from the plurality of types of moving image information on the basis of the random selection result. Further, the game control unit 130 performs an operation to determine whether or not a condition corresponding to the progress of the game is met for a determination period (in this embodiment, one second) immediately preceding the point at which reproduction of one moving image ends, and select a corresponding moving image when the condition is met.

Table 2 illustrates the plurality of types of moving images that can be selected by random motion selection.

TABLE 2

| Moving image no. | Time [sec] | Number of frames | Action | Condition |
|---|---|---|---|---|
| 2-1 | 2 | 60 | Place your bets | No bets on any stations |
| 2-2 | 3 | 90 | Call in bets | No bets on at least 80% of stations |
| 2-3 | 2 | 60 | Nod | Bet placed in specific region of corresponding table |
| 2-4 | 3 | 90 | Tap table (on banker chip tower side) | Bet of at least a fixed amount placed on corresponding table within condition effective period (banker side) |
| 2-5 | 3 | 90 | Tap table (on player chip tower side) | Bet of at least a fixed amount placed on corresponding table within condition effective period (banker side) |
| 2-6 | 3 | 90 | Tap table + wink | Bet of at least a fixed amount placed on corresponding table within condition effective period (player side) |
| 2-7 | 3 | 90 | Tap table twice with open palm + wink | Bet of at least a fixed amount placed on corresponding table within condition effective period (player side) |
| 2-8 | 3 | 90 | Wave | Pay out within condition effective period |
| 2-9 | 3 | 90 | Cover mouth with hand and yawn | N/A |
| 2-10 | 3 | 90 | Look aside | Selected at fixed probability when bet placed within condition effective period |
| 2-11 | 3 | 90 | Converse | N/A |
| 2-12 | 3 | 90 | Look back and talk | N/A |
| 2-13 | 3 | 90 | Show empty hands | N/A |
| 2-14 | 3 | 90 | Touch cheek | N/A |
| 2-15 | 3 | 90 | Turn neck left and right | N/A |
| 2-16 | 3 | 90 | Look around | N/A |
| 2-17 | 3 | 90 | Rotate right shoulder | N/A |
| 2-18 | 3 | 90 | Scratch head | N/A |
| 2-19 | 2 | 60 | Blink | N/A |
| 2-20 | 3 | 90 | Smile from beneath eyelashes | N/A |
| 2-21 | 2 | 60 | Wink | Maximum bet amount placed at corresponding table within condition effective period |

TABLE 2-continued

| Moving image no. | Time [sec] | Number of frames | Action | Condition |
|---|---|---|---|---|
| 2-22 | 2 | 60 | Stare | N/A |
| 2-23 | 3 | 90 | Touch collar bone on opposite side to hand | N/A |
| 2-24 | 3 | 90 | Touch hair | N/A |
| 2-25 | 3 | 90 | Blow a kiss | At least fixed number of consecutive wins |
| 2-26 | 3 | 90 | Beckon with hand | N/A |
| 2-27 | 2 | 60 | Lick upper lip | N/A |
| 2-28 | 3 | 90 | Shake body slowly | Touch dealer at station 200 within condition effective period |
| 2-29 | 3 | 90 | Rest cheeks in both hands | At least fixed number of consecutive wins |

As shown on Table 2, a large number of moving images having a play time of two to three seconds (60 to 90 frames) are prepared as the moving images that can be selected by random motion selection. In cases where a "condition" is attached to the moving image, this means that the moving image is selected when the progress of the game meets the condition during the determination period at the end of the immediately preceding moving image. The moving images to which a "condition" is not attached are selected at random in accordance with the random selection result generated by the game control unit 130.

More specifically, the moving image 2-1 "Place your bets" is a moving image comprising an action for encouraging the user to place a bet in a condition where no bets have been input into any of the stations 200 at the beginning of the betting period or the like. Similarly, the moving image 2-2 "Call in bets" is a moving image comprising an action for encouraging bets when bets have not been input on 80% of the stations 200. The moving image 2-3 "Nod" is selected on condition that bet is placed in a specific betting region where a high dividend can be expected or the like. The moving images 2-4 to 2-7 "Tap table" are moving images indicating admiration, and are selected on condition that a bet of at least a fixed amount is placed within a condition effective period. The moving image 2-8 "Wave" is a moving image expressing farewell, and is displayed on condition that a payout is made within the condition effective period. The moving image 2-10 "Look aside" is a moving image selected at a fixed probability when the conditions of the moving images 2-4 to 2-7 are met within the condition effective period. The moving image 2-21 "Wink" is a moving image expressing maximum admiration, and is selected on condition that a maximum bet is placed within the condition effective period. The moving image 2-25 "Blow a kiss" and the moving image 2-29 "Rest cheeks in both hands" are selected to express admiration when the user achieves consecutive wins. The moving image 2-28 "Shake body slowly" is selected when the user touches the "dealer" displayed on the touch panel display 201 of the station 200 during the condition effective period. The other moving images are selected as appropriate on the basis of the random selection result generated by the game control unit 130 when the progress of the game does not meet any of the conditions.

Figure 16:
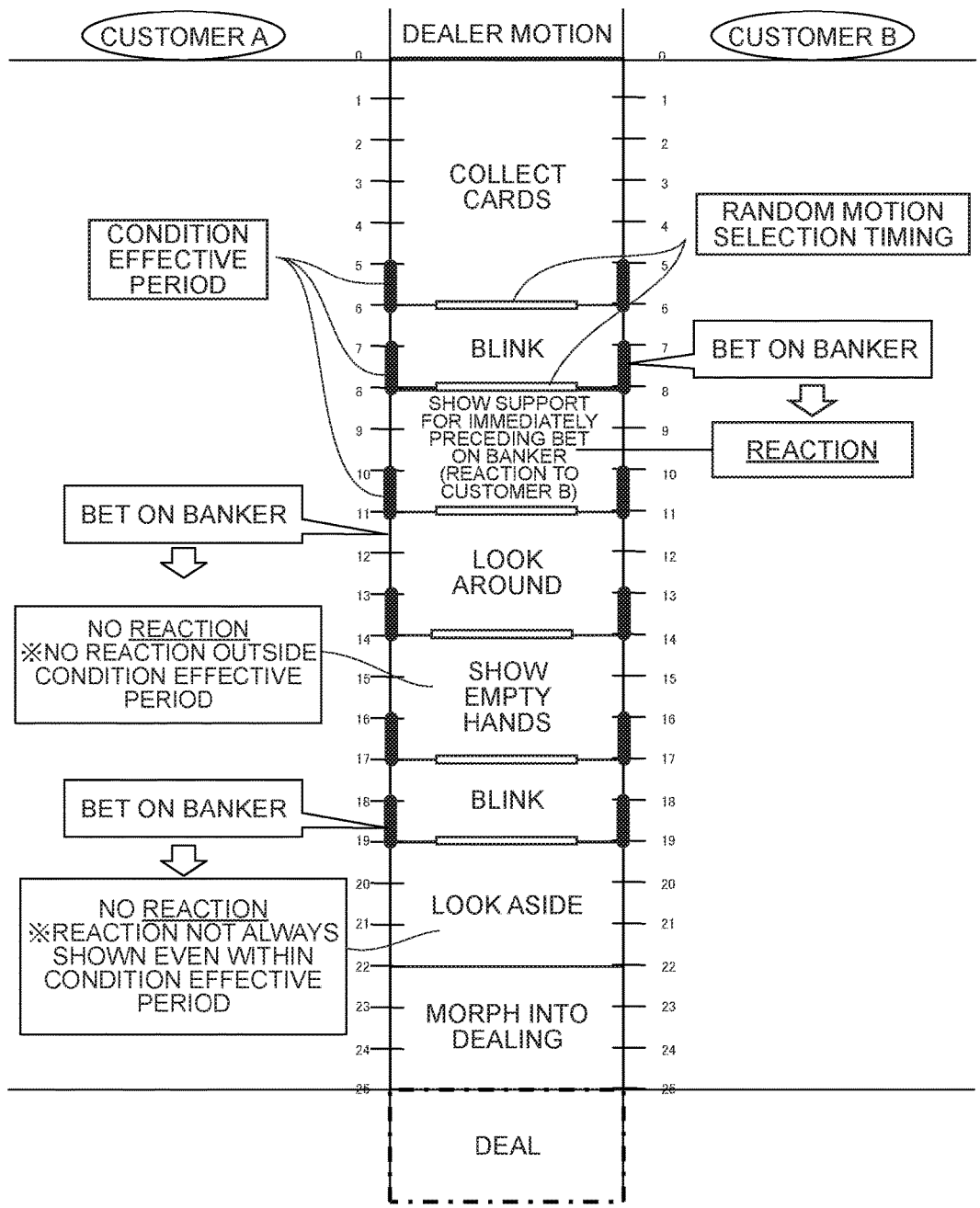
FIG. 16 is a sequence diagram showing an example of random motion selection during a betting period.

FIG. 16 shows a specific example of a moving image selection sequence executed during the betting period. In the example shown in FIG. 16, the length of the betting period is set at 25 seconds, and the moving images are selected and connected by morphing processing in accordance with the content of the operations performed by the user. The content illustrated in the column "Dealer motion" shows the selected moving image, while the content illustrated in the columns "Customer A" and "Customer B" shows the content of operations input by a customer A and a customer B serving as users by operating the operating units 202 of the stations 200, and reactions of the sub controllers 100 thereto. Although not shown in the drawing, it is assumed that different moving images (motions) are connected to each other by the morphing processing described on the basis of FIG. 5.

First, for the first six seconds of the betting period, one of the moving images 1-1 to 1-6, showing "Card collection", is selected and displayed in accordance with the condition in which the cards were dealt during the previous round of the game. The condition effective period is set to last for the final second (from the fifth second to the sixth second of the elapsed time) of the moving image display period. The condition effective period is a period for determining whether or not any of the conditions shown on Table 2 are met. Here, no input is received from a particular user, and therefore the game control unit 130 implements random selection following the elapse of six seconds, and selects the moving image 2-19 "Blink" to be displayed next.

Next, a bet of a fixed amount is placed on the banker side from the station 200 of "Customer B" within the condition effective period at the end of the display period of the moving image 2-19 "Blink", and therefore the progress of the game meets the condition of the moving image 2-4 or 2-5 "Tap table". Accordingly, the game control unit 130 selects one of the moving images 2-4 and 2-5 by executing random selection, and displays the "Tap table" moving image. As a result of this processing, the dealer performs a response action that corresponds to the input from the user, and therefore the user feels as if he or she is playing with a real-life dealer, leading to a heightened sense of realism.

Next, the game control unit 130 executes random selection again at the end of the "Tap table" moving image (following the elapse of 11 seconds), and selects the moving image 2-16 "Look around" to be displayed next. It is assumed here that the user "Customer A" places a bet of at least a fixed amount on the banker side following the elapse of 11.5 seconds. However, the condition effective period set in relation to the moving image "Look around" extends from 13 to 14 seconds, and therefore the game control unit 130 ignores the bet, executes random selection at the end of the moving image "Look around" (following the elapse of 14 seconds), and selects the moving image 2-13 "Show empty hands" to be displayed next.

Similar processing is then repeated, whereby the moving image 2-19 "Blink" is selected again after the moving image "Show empty hands", in which the dealer performs an action of turning the palms of his or her hands upward. It is assumed this time that the user "Customer A" places a bet of at least a fixed amount on the banker side during the condition effective period (extending from 18 to 19 seconds) set in relation to the moving image "Blink". Normally, when this condition is satisfied during the condition effective period, one of the moving images 2-4 to 2-7 "Tap table" is selected, but the game control unit 130 executes random selection and selects the moving image 2-10 "Look aside" at a fixed probability even when the condition is met. Here, the dealer performs the action "Look aside" to indicate that he or she did not notice the bet placed by the user. By having the dealer perform an action (an oversight) that might well be taken by real-life human dealer with a relatively small probability, the dealer appears more real.

As described above, morphing processing is executed at the end of the betting period to advance to the dealing period (FIG. 15, step S104). At the beginning of the dealing period, a moving image 3-1 "No more bets+deal four cards" is selected, and therefore processing is performed to morph into this moving image.

Dealing Period

Table 3 illustrates a plurality of types of moving images that can be selected during the dealing period.

TABLE 3

| Moving image no. | Time [sec] | Number of frames | Action | Condition |
| --- | --- | --- | --- | --- |
| 3-1 | 7.5 | 225 | No more bets + deal four cards | N/A |
| 3-2 | 2.5 | 75 | Deal third card to player side | Total face value on player side no higher than five |
| 3-3 | 2.5 | 75 | Deal third card to banker side | Depends on total face value, face value of third card on player side |

Returning to FIG. 15, after entering the dealing period, the routine advances to step S200, where the game control unit 130 selects the moving image 3-1 "No more bets+deal four cards". The moving image consists of an action corresponding to "No more bets" and an action corresponding to "Deal four cards", which are reproduced consecutively in the first half (0 to 7.5 seconds, for example) of the dealing period (15 seconds, for example), for example. Regardless of which cards are dealt to the banker side and the player side, at least two cards are dealt to each side, and therefore images thereof are handled as a single image.

In step S202, the game control unit 130 determines the moving images to be selected in the second half of the dealing period (7.5 to 15 seconds, for example) in accordance with the content of the cards dealt to the respective sides. The content of the cards (ace, number cards from 2 to 9, and picture cards) is determined by having the game control unit 130 execute random selection at the beginning of the dealing period. The game control unit 130 calculates the total face value of the two cards dealt to each of the banker side and the player side such that one point is added when the card is an ace, two to nine points are added respectively for cards having values of 2 to 9, and zero points are added for picture cards. Determinations as to whether to terminate the card game as is or to deal a third card are then made in accordance with the total face value while following the rules of the card game.

For example, when a third card is not dealt to either the banker side or the player side, the routine advances to step S204, where the game control unit 130 selects and displays a standby motion that is displayed when no more cards are to be dealt.

Alternatively, when a third card is to be dealt only to the player side, the routine advances to step S206, where the game control unit 130 selects the moving image 3-2 "Deal third card to player side", which shows a third card being dealt to the player side. The routine then advances to step S208, where the game control unit 130 selects the standby motion.

Further, when a third card is to be dealt only to the banker side, the routine advances to step S210, where the game control unit 130 selects the moving image 3-3 "Deal third card to banker side", which shows a third card being dealt to the banker side. The routine then advances to step S212, where the game control unit 130 selects the standby motion.

Furthermore, when a third card is to be dealt to both the player side and the banker side, the routine advances to step S214, where the game control unit 130 selects the moving image 3-2 "Deal third card to player side", and then advances to step S216, where the game control unit 130 selects the moving image 3-3 "Deal third card to banker side". Once third cards have been dealt to both the player side and the banker side, the game control unit 130 advances to the dividend distribution period without selecting the standby motion, as in steps S208 and S212.

Dividend Distribution Period

Table 4 illustrates a plurality of types of moving images that can be selected during the dividend distribution period.

TABLE 4

| Moving image no. | Time [sec] | Number of frames | Action | Condition |
| --- | --- | --- | --- | --- |
| 4-1 | 3 | 90 | Applause | Bets placed only on winning side |
| 4-2 | 3 | 90 | OK sign | Bets placed only on winning side |
| 4-3 | 3 | 90 | Smile | Bets placed only on winning side |
| 4-4 | 3 | 90 | Apology | Bets placed only on losing side |

After entering the dividend distribution period, an action corresponding to the outcome determined in the dealing period is displayed. For example, in a case where only users on the winning side, among the banker side and the player side, have placed bets, the routine advances to step S300, where the game control unit 130 executes random selection. The routine then advances to step S302, where one of the moving image 4-1 "Applause", the moving image 4-2 "OK sign", and the moving image 4-3 "Smile" is selected and displayed. The reason for this is that no users have lost in this round of the game, and it is therefore possible to please everyone without spoiling the mood of a user.

In a case where only users on the losing side, among the banker side and the player side, have placed bets, the game control unit 130 selects and displays the moving image 4-4 "Apology" instead of executing random selection. The reason for this is that no users have won in this round of the game, and it is therefore possible to console everyone without spoiling the mood of a user.

Further, in a case where the users have placed bets on both the banker side and the player side, the game control unit 130 selects a neutral connecting moving image "Wait". The reason for this is that in this round of the game, both winning users and losing users exist, and it is therefore inappropriate for the dealer to perform an action that appears biased toward one side.

The dividend distribution period is set at an appropriate length for paying out dividends, for example five seconds. When the dividend distribution period ends, the routine advances to card collection (step S100) in preparation for the next round of the game. The moving image selected during card collection is selected from the moving images 1-1 to 1-4 in accordance with the respective numbers of cards dealt to the banker side and the player side in the current round of the game.

5. Effects of this Embodiment (5-1) According to this embodiment, the attitude adopted by the dealer at the end of the first moving image and the beginning of the second moving image is set to be an identical basic attitude, and when the first moving image is switched to the second moving image, an interpolation image that connects the frame image at the end of the first moving image to the frame image at the beginning of the second moving image is generated by performing morphing processing over the predetermined transition period. In so doing, a plurality of moving images displaying different dealer actions can be connected freely. As a result, images showing natural actions performed by a real-life dealer without repeating the same action over and over again can be displayed even when live-action moving images are used.

(5-2) According to this embodiment, the game control unit 130 selects one set of moving image information from the plurality of types of moving image information on the basis of a random selection result, and therefore moving images showing the dealer performing unpredictable random actions can be presented. As a result, the user feels as if he or she is playing with a real-life dealer, leading to a heightened sense of realism.

(5-3) According to this embodiment, the game control unit 130 selects the moving image information in response to the operation information input by the user operating the station 200, and therefore a sense of realism in which the real-life dealer appears to perform actions in response to the user can be realized.

(5-4) According to this embodiment, the game control unit 130 permits the selection of moving image information corresponding to a moving image displayed in response to operation information input during the condition effective period, and therefore the responding moving image is presented only when the operation information is provided in a timely fashion. As a result, responses that would be taken by a real-life dealer can be maintained.

(5-5) According to this embodiment, the moving image information is obtained by filming the dealer from a predetermined filming viewpoint while the dealer handles colored cards colored a specific color on a colored table colored the specific color using the specific color as a background, and then implementing chroma key processing to remove the specific color, whereupon the moving image V subjected to the chroma key processing is mapped onto the moving image plane Pv disposed on the world coordinate system. As a result, the live-action moving image can be handled as an object.

(5-6) According to this embodiment, the table object Otis disposed behind the moving image plane Pv on which the moving image V is mapped, and therefore an unnatural image on which a part of the body of the dealer is hidden by the table can be prevented from appearing.

(5-7) According to this embodiment, the card objects Oc are disposed on the far side of the moving image V, and therefore, when the dealer is holding one of the cards, the hand of the dealer is displayed preferentially over the card at all times. As a result, an unnatural image on which the card is hidden by the dealer can be prevented from appearing.

(5-8) According to this embodiment, when a part of the moving image V and the card object Och overlap, the moving image V is generated such that the overlapping part is cut out by the chroma key processing. Accordingly, the card object Och disposed behind the moving image V is viewed through the cutout part of the moving image V, and as a result, an unnatural image on which the card is hidden by the body of the dealer can be prevented from appearing.

(5-9) According to this embodiment, when the stereoscopic image enlarged display mode is requested, the viewpoint setting unit 118 sets the viewing angle (the angle of view) to be relatively narrow, and as a result, an enlarged display showing stereoscopic images can be realized.

(5-10) According to this embodiment, when the planar image enlarged display mode is requested, planar images comprising identical types of cards to the generated card objects are displayed, and as a result, an enlarged display can be realized using simple planar images.

(5-11) According to this embodiment, when modification of the background images BG1 to BG4 is requested, the background image generation unit 124 that generates the background image varies only the sight line direction while prohibiting modification of the relative positions of the card objects Oc and the viewpoint C on the world coordinate system. As a result, an image on which a camera appears to be filming while panning can be presented without varying the positional relationships between the dealer, the cards, and the table.

With the game image generation device and program according to the present disclosure, as described above, a continuous moving image obtained by connecting a plurality of moving images freely, the plurality of moving images having been created by filming a real-life subject, can be presented, and therefore the present disclosure can be applied to fields in which it is desirable to allow a subject to perform natural, irregular actions and to respond interactively.

For example, the present disclosure is not limited to a card game, and may be applied to a game system that uses other live-action movies. Moreover, the present disclosure is not limited to games and may also be applied to a business simulation device or the like.

DESCRIPTION OF REFERENCE NUMBERS

10 Main body
100, 100-1 to 100-5 Sub controller
101 CPU
102 ROM
103 RAM
104 Display controller
105 Hard disk
106 Interface device
107, 107-1 to 107-5 Sub display
110 Moving image storage unit
112 Moving image generation unit
114 Object image storage unit
116 Object arranging unit
118 Viewpoint setting unit
120 Projection conversion unit
122 Mapping unit
124 Background image generation unit
130 Game control unit
200, 200-1 to 200-n Station 201 Touch panel display
202 Operating unit
300 Main controller
301 Main display
BG, BG1 to BG5 Background image
C Viewpoint
Oc, Och Card object
Ot Table object
Pv Moving image plane
Pb, Pb1 to Pb5 Background image plane
VV, VV1 View volume

What is claimed is:

1. A game image generation device, comprising:
a moving image storage unit that stores moving image information used to generate a moving image of a subject;
a moving image generation unit that generates said moving image by reading said moving image information; and
a game control unit that controls progress of said game,
wherein a plurality of types of said moving image information are stored in accordance with different actions of said subject,
said moving image generation unit switches from a first moving image to a second moving image by inserting an interpolation image that connects a frame image at the end of said first moving image to a frame image at the beginning of said second moving image, and
said moving image information is obtained by filming said subject from a predetermined filming viewpoint while said subject handles colored cards colored a specific color on a colored table colored said specific color using said specific color as a background, and then implementing chroma key processing to remove said specific color,
the game image generation device further comprising:
an object arranging unit that arranges a table object, card objects, and a moving image plane on which said moving image is mapped on a world coordinate system;
a viewpoint setting unit that sets a relative position of a viewpoint relative to said card objects on said world coordinate system so as to correspond to a relative position of said filming viewpoint relative to said colored cards during filming of said moving image;
a mapping unit that maps textures onto said table object and said card objects and maps said moving image on said moving image plane; and
a projection conversion unit that performs projection conversion using said viewpoint as a reference.

2. The game image generation device according to claim 1, wherein when an enlarged display is requested, said viewpoint setting unit narrows a viewing angle while keeping a position of said viewpoint on said world coordinate system fixed.

3. The game image generation device according to claim 1, wherein when an enlarged display is requested, planar images including identical types of cards to said generated card objects are displayed.

4. The game image generation device according to claim 1, wherein when modification of a sight line direction is requested, said sight line direction is modified while keeping a position of said viewpoint on said world coordinate system fixed.

5. A game image generation method, comprising the steps of:
obtaining a plurality of types of moving image information by filming a subject from a predetermined filming viewpoint in accordance with different actions of said subject, said plurality of types of moving image information being made such that a posture of said subject at the end of one type of moving image information is the same as a posture of said subject at the beginning of another type of moving image information; and
generating a moving image of said subject by reading a first moving image information and a second moving image information and by switching from a first moving image generated from said first moving image information to a second moving image generated from said second moving image information by inserting an interpolation image that connects a frame image at the end of said first moving image information to a frame image at the beginning of said second moving image information.

6. The game image generation method according to claim 5, wherein said moving image information is filmed while said subject handles colored cards colored a specific color on a colored table colored said specific color using said specific color as a background, and then implementing chroma key processing to remove said specific color,
the game image generation method further comprising the steps of:
arranging a table object, card objects, and a moving image plane on which said moving image is mapped on a world coordinate system;
setting a relative position of a viewpoint relative to said card objects on said world coordinate system so as to correspond to a relative position of said filming viewpoint relative to said colored cards during filming of said moving image;
mapping textures onto said table object and said card objects and mapping said moving image on said moving image plane; and
performing projection conversion using said viewpoint as a reference.

7. The game image generation method according to claim 5, wherein said second moving image information is selected from said plurality of types of moving image information on the basis of a random selection result.

8. The game image generation method according to claim 5, wherein moving image information corresponding to a specific response moving image is selected as said second moving image information on the basis of input operation information.

9. The game image generation method according to claim 8, wherein said moving image information corresponding to said response moving image is selected when said operation information is input within a predetermined condition effective period.

* * * * *